(12) United States Patent
Han et al.

(10) Patent No.: US 12,441,717 B2
(45) Date of Patent: Oct. 14, 2025

(54) CRYSTAL FORM OF POLYCYCLIC ANAPLASTIC LYMPHOMA KINASE INHIBITOR

(71) Applicants: SHANDONG XUANZHU PHARMA CO., LTD., Jinan (CN); XUANZHU BIOPHARMACEUTICAL CO., LTD., Shijiazhuang (CN)

(72) Inventors: Guohui Han, Jinan (CN); Haibo Wang, Jinan (CN)

(73) Assignees: SHANDONG XUANZHU PHARMA CO., LTD., Jinan (CN); XUANZHU BIOPHARMACEUTICAL CO., LTD., Shijiazhuang (CN)

( * ) Notice: Subject to any disclaimer, the term of this patent is extended or adjusted under 35 U.S.C. 154(b) by 588 days.

(21) Appl. No.: 17/793,275

(22) PCT Filed: Jan. 15, 2021

(86) PCT No.: PCT/CN2021/072088
§ 371 (c)(1),
(2) Date: Jul. 15, 2022

(87) PCT Pub. No.: WO2021/143819
PCT Pub. Date: Jul. 22, 2021

(65) Prior Publication Data
US 2023/0348443 A1 Nov. 2, 2023

(30) Foreign Application Priority Data
Jan. 17, 2020 (CN) .................. 202010051060.1

(51) Int. Cl.
*C07D 405/14* (2006.01)
(52) U.S. Cl.
CPC ........ *C07D 405/14* (2013.01); *C07B 2200/13* (2013.01)

(58) Field of Classification Search
CPC .................. C07D 405/14; C07B 2200/13
(Continued)

(56) References Cited

FOREIGN PATENT DOCUMENTS

| CN | 105601614 A | 5/2016 |
|---|---|---|
| CN | 105622577 A | 6/2016 |

(Continued)

OTHER PUBLICATIONS

International Search Report and Written Opinion for Application No. PCT/CN2021/072088, dated Apr. 21, 2021, 8 pages.
(Continued)

*Primary Examiner* — Jeffrey S Lundgren
*Assistant Examiner* — Heather Dahlin
(74) *Attorney, Agent, or Firm* — McCarter & English, LLP; Wei Song

(57) ABSTRACT

The present invention relates to a crystal form of a polycyclic anaplastic lymphoma kinase inhibitor and a preparation method therefor, a pharmaceutical composition comprising the crystal form, and use of the crystal form or the pharmaceutical composition. Specifically, the present invention relates to a crystal form of a compound, i.e., 5-chloro-$N^4$-(2-(isopropylsulfonyl)phenyl)-$N^2$-(7-methyl-8-(piperidin-4-yl)-2,3-dihydrobenzo[b][1,4]dioxin-5-yl)pyrimidine-2,4-diamine, that is represented by formula (1) and serves as an anaplastic lymphoma kinase inhibitor, a preparation method therefor, a pharmaceutical composition comprising the crystal form, and the use of the crystal form or the pharmaceutical composition in a medication for preventing and/or treating an anaplastic lymphoma kinase-mediated cancer or a non-cancer related disease.

(Continued)

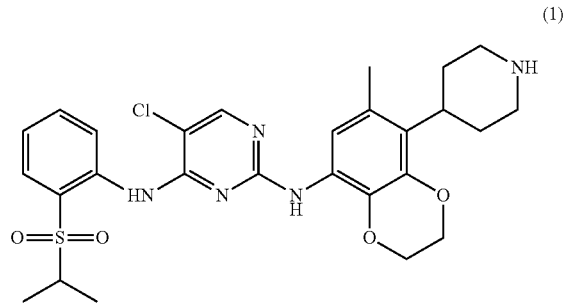

(1)

20 Claims, 12 Drawing Sheets

(58) Field of Classification Search
USPC .................................................. 514/275
See application file for complete search history.

(56) References Cited

FOREIGN PATENT DOCUMENTS

| JP | 2013-545812 A | 12/2013 | | |
|----|----|----|----|----|
| JP | 2017-530139 A | 10/2017 | | |
| WO | 2012/082972 A1 | 6/2012 | | |
| WO | WO2016050171 A1 | * | 4/2016 | ........... C07D 405/14 |

OTHER PUBLICATIONS

Hirayama, Organic Compound Crystal Production Handbook. Maruzen Company Limited. pp. 17-23, 37-40, 45-51, 57-65, (2008).
Kazuhide, Physico-Chemical Studies on the Molecular Details of Drug Crystals. Pharm Tech Japan. 2002;18(10):81-96.
Mangin et al., Polymorphism in Processes of Crystallization in Solution: A Practical Review. Organic Process Research & Development. 2009;13:1241-1253.
The Chemical Society of Japan, Dissolution/precipitation/defiltration/dialysis. Experimental Chemistry Course 1 Basic Operations, Maruzen Company, Limited. pp. 184-189, (1996).
Japanese Office Action for Application No. 2022-543598, dated Jun. 27, 2023, 8 pages.
Bernstein, Polymorphism in Molecular Crystals. International Union of Crystallography Book Series. Clarendon Press, Oxford. pp. 244-249, (2002).
Caira, Crystalline Polymorphism of Organic Compounds. Topics in Current Chemistry. 1998;198;163-208.
Kummerer, Pharmaceuticals in Environment. Annu Rev Environ Resour. 2010;35:57-75.
Kukesa, Clinical Pharmacokinetics: Theoretical, Applied and Analytical Aspects, a Handbook. 432 pages, (2009).
Mitkina et al., Stress testing and photostability as part of pharmaceutical drug development data. Gazette of the Scientific Center for Expertise of Medicine Use. 2015;2:9-12.
Rodriguez-Spong et al., General principles of pharmaceutical solid polymorphism: a supramolecular perspective. Adv Drug Deliv Rev. Feb. 23, 2004;56(3):241-74.
Sarma et al., Solid forms of pharmaceuticals: Polymorphs, salts and cocrystals. Korean J Chem Eng. 2011;28(2):315-322.
Variankaval et al., From Form to Function: Crystallization of Active Pharmaceutical Ingredients. AIChE Journal. Jul. 2008;54(7):1682-1688.

* cited by examiner

CRYSTAL FORM OF POLYCYCLIC ANAPLASTIC LYMPHOMA KINASE INHIBITOR

CROSS-REFERENCE TO RELATED APPLICATIONS

This application is a U.S. national stage filing, under 35 U.S.C. § 371(c), of International Application No. PCT/CN2021/072088, filed on Jan. 15, 2021, which claims priority to Chinese Patent Application No. 202010051060.1, filed on Jan. 17, 2020.

1. TECHNICAL FIELD

The present invention belongs to the field of medicine and relates to a crystal form of a polycyclic anaplastic lymphoma kinase inhibitor, a preparation method for the crystal form, a pharmaceutical composition comprising the crystal form, and the use of the crystal form or pharmaceutical composition in the preparation of a medicament for the treatment and/or prevention of an ALK-mediated disease.

2. Background Art

A compound of formula (1), i.e. 5-chloro-N'-(2-(isopropylsulfonyl)phenyl)-N²-(7-methyl-8-(piperidin-4-yl)-2,3-dihydrobenzo[b][1,4]dioxin-5-yl)pyrimidine-2,4-diamine (referred to as compound of formula (1) in the description, which has been described in the patent application PCT/CN2015/090712), is an anaplastic lymphoma kinase inhibitor. Anaplastic lymphoma kinase (ALK), a member of the receptor tyrosine kinase family, can recruit a downstream protein by autophosphorylation and then cause expression of a specific gene to regulate cell metabolism and growth. Anaplastic lymphoma kinase was first discovered in anaplastic large cell lymphoma (ALCL) and later found to be highly expressed also in non-small cell lung cancer (NSCLC).

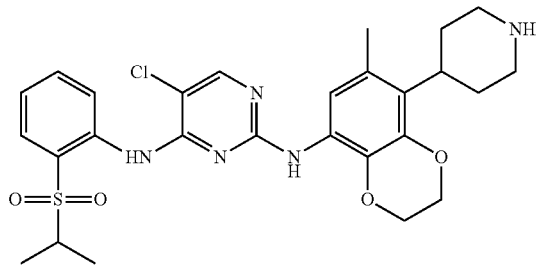

Formula (1)

Abnormal expression of ALK in some ALCL/NSCLCs arises from different chromosomal translocations. These chromosomal translocations can result in corresponding fusion proteins. The genetic analysis of these fusion proteins has shown that they all contain a gene sequence encoding an intracellular kinase region at the 3' end of the ALK gene, and gene fragments fused with ALK all contain a promoter element and a coding sequence that mediates self-dimerization, leading to high expression and over-activation of a fusion protein with ALK kinase activity in cells, causing malignant transformation of cells. Therefore, the activity of the intracellular kinase region of ALK and the corresponding signaling pathway are important molecular mechanisms leading to the formation of ALCL. After ALK, ROS1 is currently a relatively hot target gene studied in lung adenocarcinoma. ROS1 is a member of the receptor tyrosine kinase family, and the incidence of ROS1 in NSCLC is about 1.7%. ROS1 and the anaplastic lymphoma kinase ALK share a homology of 49% across the amino acid kinase domain and an identity of 77% in the ATP binding sites, which makes it possible to treat ROS1-rearrangement-positive NSCLC using an ALK kinase inhibitor.

It can be seen therefrom that the development of a small molecule inhibitor against ALK/ROS1 can effectively reduce the impact of mutated ALK/ROS1 gene on a downstream protein, which in turn affects tumor cell invasion and proliferation and other effects and ultimately affects the growth of tumor cells, thereby providing an antitumor effect.

The study of crystal forms plays an important role in the process of drug development. Different crystal forms of the same drug have significant differences in solubility, stability, bioavailability, etc. In order to better control the quality of the drug and meet the requirements of formulation, production, transportation, etc., we have studied the crystal forms of the compound of formula (1), in order to find out a crystal form with good properties.

3. Summary of the Invention

The present invention relates to a crystal form of 5-chloro-N⁴-(2-(isopropylsulfonyl)phenyl)-N²-(7-methyl-8-(piperidin-4-yl)-2,3-dihydrobenzo[b][1,4]d ioxin-5-yl)pyrimidine-2,4-diamine represented by formula (1) as a polycyclic anaplastic lymphoma kinase inhibitor. The present invention further relates to a preparation method for the crystal form, a pharmaceutical composition comprising the crystal form, and the use of the crystal form or pharmaceutical composition in the preparation of a medicament for the prevention and/or treatment of an ALK-mediated disease.

The present invention provides crystal form B of a compound of formula (1), characterized by an X-ray powder diffraction pattern comprising characteristic peaks at 11.9±0.2°, 14.0±0.2°, 15.2±0.2°, 17.2±0.2°, 17.5±0.2°, and 21.5±0.2° expressed as 2θ angles using Cu-Kα radiation:

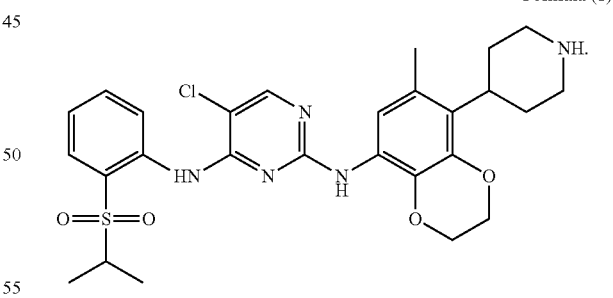

Formula (1)

In some embodiments, provided herein is the crystal form B of the compound of formula (1) characterized by an X-ray powder diffraction pattern comprising further characteristic peaks at 12.3±0.2°, 15.8±0.2°, 18.5±0.2°, 19.0±0.2°, 19.3±0.2°, and 20.4±0.2° expressed as 2θ angles using Cu-Kα radiation in addition to the above-mentioned characteristic peaks.

In some embodiments, provided herein is the crystal form B of the compound of formula (1) characterized by an X-ray powder diffraction pattern comprising further characteristic peaks at 8.6±0.2°, 10.2±0.2°, 20.7±0.2°, 21.9±0.2°, 24.0±0.2°, and 24.3±0.2° expressed as 2θ angles using Cu-Kα radiation in addition to the above-mentioned characteristic peaks.

In some embodiments, provided herein is the crystal form B of the compound of formula (1) characterized by an X-ray powder diffraction pattern comprising characteristic peaks at 11.9±0.2°, 14.0±0.2°, 15.2±0.2°, 17.2±0.2°, 17.5±0.2°, and 21.5±0.2° expressed as 2θ angles using Cu-Kα radiation; further characteristic peaks at 12.3±0.2°, 15.8±0.2°, 18.5±0.2°, 19.0±0.2°, 19.3±0.2°, and 20.4±0.2° expressed as 2θ angles using Cu-Kα radiation; and further characteristic peaks at 8.6±0.2°, 10.2±0.2°, 20.7±0.2°, 21.9±0.2°, 24.0±0.2°, and 24.3±0.2° expressed as 2θ angles using Cu-Kα radiation.

In some embodiments, provided herein is the crystal form B of the compound of formula (1) characterized by an X-ray powder diffraction pattern (substantially) as shown in FIG. 1 expressed as 2θ angles using Cu-Kα radiation.

In some embodiments, provided herein is the crystal form B of the compound of formula (1) characterized by a differential scanning calorimetry analysis diagram comprising an endothermic peak in the range of about 190° C. to 205° C.; in some embodiments, provided herein is the crystal form B of the compound of formula (1) characterized by a differential scanning calorimetry analysis diagram comprising an endothermic peak in the range of 197° C.±2° C.; and in some embodiments, provided herein is the crystal form B of the compound of formula (1) characterized by a differential scanning calorimetry analysis diagram substantially as shown in FIG. 2.

In some embodiments, provided herein is the crystal form B of the compound of formula (1) characterized by a thermogravimetric analysis wherein the crystal form B has no weight loss at 250° C. or less; and in some embodiments, crystal form B of the compound of formula (1) characterized by a thermogravimetric analysis diagram substantially as shown in FIG. 3.

The present invention provides crystal form A of a compound of formula (1) characterized by an X-ray powder diffraction pattern comprising characteristic peaks at 4.8±0.2°, 9.6±0.2°, 12.1±0.2°, 12.9±0.2°, 14.0±0.2°, and 15.0±0.2° expressed as 2θ angles using Cu-Kα radiation.

In some embodiments, provided herein is the crystal form A of the compound of formula (1) characterized by an X-ray powder diffraction pattern comprising further characteristic peaks at 7.3±0.2°, 15.6±0.2°, 15.9±0.2°, 16.7±0.2°, 18.0±0.2°, 19.0±0.2°, and 19.5±0.2° expressed as 2θ angles using Cu-Kα radiation in addition to the above-mentioned characteristic peaks.

In some embodiments, provided herein is the crystal form A of the compound of formula (1) characterized by an X-ray powder diffraction pattern comprising further characteristic peaks at 9.9±0.2°, 13.5±0.2°, 18.3±0.2°, 19.9±0.2°, 20.6±0.2°, and 21.2±0.2° expressed as 2θ angles using Cu-Kα radiation in addition to the above-mentioned characteristic peaks.

In some embodiments, provided herein is the crystal form A of the compound of formula (1) characterized by an X-ray powder diffraction pattern comprising characteristic peaks at 4.8±0.2°, 9.6±0.2°, 12.1±0.2°, 12.9±0.2°, 14.0±0.2°, and 15.0±0.2° expressed as 2θ angles using Cu-Kα radiation; further characteristic peaks at 7.3±0.2°, 15.6±0.2°, 15.9±0.2°, 16.7±0.2°, 18.0±0.2°, 19.0±0.2°, and 19.5±0.2° expressed as 2θ angles using Cu-Kα radiation; and further characteristic peaks at 9.9±0.2°, 13.5±0.2°, 18.3±0.2°, 19.9±0.2°, 20.6±0.2°, and 21.2±0.2° expressed as 2θ angles using Cu-Kα radiation.

In some embodiments, provided herein is the crystal form A of the compound of formula (1) characterized by an X-ray powder diffraction pattern substantially as shown in FIG. 4.

In some embodiments, crystal form A of the compound of formula (1) has an endothermic peak in the range of about 172° C. to 182° C. in a differential scanning calorimetry analysis diagram; in some embodiments, crystal form A of the compound of formula (1) has an endothermic peak in the range of 179° C.±2° C. in a differential scanning calorimetry analysis diagram; and in some embodiments, crystal form A of the compound of formula (1) has a differential scanning calorimetry analysis diagram substantially as shown in FIG. 5.

In some embodiments, crystal form A of the compound of formula (1) has no weight loss at 250° C. or less, as determined by thermogravimetric analysis; and in some embodiments, crystal form A of the compound of formula (1) has a thermogravimetric analysis diagram substantially as shown in FIG. 6.

The present invention provides crystal form X of a compound of formula (1) characterized by an X-ray powder diffraction pattern comprising characteristic peaks at 4.7±0.2°, 9.4±0.2°, 13.7±0.2°, 16.4±0.2°, 17.5±0.2°, and 20.2±0.2° expressed as 2θ angles using Cu-Kα radiation.

In some embodiments, provided herein is the crystal form X of the compound of formula (1) characterized by an X-ray powder diffraction pattern comprising further characteristic peaks at 6.4±0.2°, 8.7±0.2°, 10.4±0.2°, 18.4±0.2°, and 18.8±0.2° expressed as 2θ angles using Cu-Kα radiation in addition to the above-mentioned characteristic peaks.

In some embodiments, provided herein is the crystal form X of the compound of formula (1) characterized by an X-ray powder diffraction pattern comprising characteristic peaks at 4.7±0.2°, 9.4±0.2°, 13.7±0.2°, 16.4±0.2°, 17.5±0.2°, and 20.2±0.2°; and further has characteristic peaks at 6.4±0.2°, 8.7±0.2°, 10.4±0.2°, 18.4±0.2°, and 18.8±0.2° expressed as 2θ angles using Cu-Kα radiation.

In some embodiments, provided herein is crystal form X of the compound of formula (1) characterized by an X-ray powder diffraction pattern substantially as shown in FIG. 7 expressed as 2θ angles using Cu-Kα radiation.

In some embodiments, crystal form X of the compound of formula (1) has an endothermic peak in the range of about 130° C. to 140° C. in a differential scanning calorimetry analysis diagram; in some embodiments, crystal form X of the compound of formula (1) has an endothermic peak in the range of 136° C.±2° C. in a differential scanning calorimetry analysis diagram; and in some embodiments, crystal form X of the compound of formula (1) has a differential scanning calorimetry analysis diagram substantially as shown in FIG. 8.

In some embodiments, crystal form X of the compound of formula (1) has no weight loss at 250° C. or less, as determined by thermogravimetric analysis; and in some embodiments, crystal form X of the compound of formula (1) has a thermogravimetric analysis diagram substantially as shown in FIG. 9.

The present invention provides crystal form 4 of a compound of formula (1) characterized by an X-ray powder diffraction pattern comprising characteristic peaks at 5.4±0.2°, 7.4±0.2°, 8.4±0.2°, 9.8±0.2°, 10.8±0.2°, and 16.7±0.2° expressed as 2θ angles using Cu-Kα radiation.

In some embodiments, provided herein is the crystal form 4 of the compound of formula (1) characterized by an X-ray powder diffraction pattern comprising further characteristic peaks at 6.4±0.2°, 12.0 0.2°, 12.8±0.2°, 13.9±0.2°, 17.7±0.2°, 19.7±0.2°, and 23.1±0.2° expressed as 2θ angles using Cu-Kα radiation in addition to the above-mentioned characteristic peaks.

In some embodiments, provided herein is the crystal form 4 of the compound of formula (1) characterized by an X-ray powder diffraction pattern comprising characteristic peaks at 5.4±0.2°, 7.4±0.2°, 8.4±0.2°, 9.8±0.2°, 10.8±0.2°, and 16.7±0.2° expressed as 2θ angles using Cu-Kα radiation; and further has characteristic peaks at 6.4±0.2°, 12.0 0.2°, 12.8±0.2°, 13.9±0.2°, 17.7±0.2°, 19.7±0.2°, and 23.1±0.2° expressed as 2θ angles using Cu-Kα radiation.

In some embodiments, provided herein is the crystal form 4 of the compound of formula (1) characterized by an X-ray powder diffraction pattern substantially as shown in FIG. 10.

In some embodiments, crystal form 4 of the compound of formula (1) shows an endothermic peak in the range of about 125° C. to 135° C. in a differential scanning calorimetry analysis diagram; in some embodiments, crystal form 4 of the compound of formula (1) has an endothermic peak in the range of 129° C.±2° C. in a differential scanning calorimetry analysis diagram; and in some embodiments, crystal form 4 of the compound of formula (1) has a differential scanning calorimetry analysis diagram substantially as shown in FIG. 11. Exemplarily, crystalline form 4 of the compound of formula (1) has a thermogravimetric analysis diagram substantially as shown in FIG. 12.

The present invention further provides a method for preparing crystal form B of a compound of formula (1), the method comprising:

mixing the compound of formula (1) with an organic solvent (as a solvent), stirring the mixture, heating the mixture to a first temperature, adding water, continuing to stir and heat the mixture to a second temperature, performing gradient cooling to 10-30° C., and performing filtration and drying to obtain crystal form B of the compound of formula (1). In some embodiments, the first temperature is selected from 40-80° C., e.g., 50-70° C., e.g., 50-80° C., e.g., 60-70° C., e.g., 60-80° C., e.g., 70-80° C., e.g., 65-75° C., e.g., 65-70° C., e.g., 70-75° C., and in some embodiments, the first temperature refers to the temperature at which a solution is heated and becomes clear. In some embodiments, the second temperature is selected from 40-80° C., e.g., 50-70° C., e.g., 50-80° C., e.g., 60-70° C., e.g., 60-80° C., e.g., 70-80° C., e.g., 65-75° C., e.g., 65-70° C., e.g., 70-75° C., and in some embodiments, the second temperature refers to the temperature at which a solution is heated and becomes clear.

In some embodiments, the first temperature is the same as the second temperature. In some embodiments, the first temperature is different from the second temperature.

In some embodiments, the water is heated and has a temperature selected from 40-80° C., e.g., 50-70° C., e.g., 50-80° C., e.g., 60-70° C., e.g., 60-80° C., e.g., 70-80° C., e.g., 65-75° C., e.g., 65-70° C., e.g., 70-75° C., and in some embodiments, the temperature of the water is kept consistent with the temperature of the solution to be added.

In some embodiments, the water is water placed at room temperature and has a temperature selected from 5-30° C., e.g., 10-30° C., e.g., 15-30° C., e.g., 20-30° C., e.g., 25-30° C.

In some embodiments, the cooling gradient is 1-15° C./h, e.g., 2-10° C./h, e.g., 3-10° C./h, e.g., 3-9° C./h, e.g., 3-8° C./h, e.g., 3-7° C./h, e.g., 3-6° C./h, e.g., 3-5° C./h, e.g., 3-4° C./h, e.g., 4-10° C./h, e.g., 4-9° C./h, e.g., 4-8° C./h, e.g., 4-7° C./h, e.g., 4-6° C./h, e.g., 4-5° C./h, e.g., 5-10° C./h, e.g., 5-9° C./h, e.g., 5-8° C./h, e.g., 5-7° C./h, e.g., 5-6° C./h, e.g., 6-10° C./h, e.g., 6-9° C./h, e.g., 6-8° C./h, e.g., 6-7° C./h, e.g., 7-10° C./h, e.g., 7-9° C./h, e.g., 7-8° C./h, e.g., 8-10° C./h, e.g., 8-9° C./h, e.g., 9-10° C./h, e.g., 8-13° C./h, e.g., 7-12° C./h, e.g., 3-13° C./h, and in some embodiments, for gradient cooling, different temperatures can be selected for cooling according to the precipitation of a sample. For example, 2° C./h, 5° C./h, 7° C./h, 10° C./h, and 12° C./h are respectively selected for cooling.

In some embodiments, gradient cooling is carried out to reach, for example, 15-30° C., e.g., 15-25° C., e.g., 20-30° C., e.g., 25-30° C., etc.

In some embodiments, the stirring in the method is mechanical stirring or manual stirring. In some embodiments, the stirring is mechanical stirring.

In some embodiments, the stirring speed is 80-180 r/h, e.g., 100-150 r/h, e.g., 100 r/h, e.g., 110 r/h, e.g., 120 r/h, e.g., 130 r/h, e.g., 140 r/h, e.g., 150 r/h.

In some embodiments, the drying described in the above-mentioned preparation method can be carried out by decompression or ventilation, and the drying temperature does not exceed 60° C., e.g., 30-55° C., e.g., 35-50° C.

In some embodiments, the method further comprises the steps of adding a seed crystal of crystal form B after the temperature has been raised to the second temperature, and maintaining the temperature under stirring, so as to facilitate the formation and precipitation of crystal form B, wherein the seed crystal of crystal form B is prepared by a method in the document of the present application in which crystal form B is prepared without adding a seed crystal.

In some embodiments, the organic solvent refers to one of or any combination of two or more (including two) solvents from the following solvents:

(1) alcohol solvents selected from aliphatic alcohol solvents, alicyclic alcohol solvents and aromatic alcohol solvents, wherein the aliphatic alcohol solvents are selected from methanol, ethanol, propanol, isopropanol, n-butanol, isobutanol, tert-butanol, sec-butanol, n-pentanol, n-hexanol, ethylene glycol, propylene glycol or glycerol; the alicyclic alcohol solvents are selected from cyclopentanol, cyclopentanemethanol, cyclohexanol, cyclohexanemethanol or cyclohexaneethanol; and the aromatic alcohol solvents are selected from benzyl alcohol, phenylethanol or phenylpropanol;

(2) nitrile solvents selected from acetonitrile or propionitrile; and (3) ketone solvents selected from aliphatic ketone solvents and cyclic ketone solvents, wherein the aliphatic ketone solvents are selected from methyl ethyl ketone, methyl isopropyl ketone, acetone, butanone, pentanone, acetylacetone, methyl butyl ketone or methyl isobutyl ketone; and the cyclic ketone solvents are selected from cycloacetone, cyclohexanone, isophorone or N-methylpyrrolidone.

The expression "any combination of two or more solvents" refers to a solvent formed by mixing two or more (including two) of the above-mentioned organic solvents at a certain ratio. The expression includes, but is not limited to, the following specific examples: methanol/ethanol, methanol/isopropanol, methanol/ethanol/isopropanol, methanol/tert-butanol, methanol/cyclopentanol, methanol/benzyl alcohol, ethanol/isopropanol, ethanol/tert-butanol, etc.

In some embodiments, the organic solvent is an organic solvent that is at least slightly soluble in water, such as an organic solvent that is miscible with water.

In some embodiments, the volume ratio of the organic solvent to water is selected from 1:6-6:1, e.g., 1:5-5:1, e.g., 1:4-4:1, e.g., 1:3-3:1, e.g., 1:2-2:1, e.g., 4:5-5:4, e.g., 1:2, e.g., 1:1, e.g., 3:2, e.g., 3:4, e.g., 3:5, e.g., 4:3, e.g., 4:5, e.g., 2:3, e.g., 5:3, e.g., 5:4, e.g., 5:6, e.g., 5:7, e.g., 5:8, e.g., 5:9, e.g., 6:5, e.g., 6:7, e.g., 6:10, e.g., 6:11, e.g., 7:4, e.g., 7:5, e.g., 7:6, e.g., 7:8, e.g., 7:9, e.g., 7:10, e.g., 7:11, e.g., 7:12, e.g., 7:13, e.g., 8:5, e.g., 8:7, e.g., 8:9, e.g., 8:11, e.g., 8:13, e.g., 8:14, e.g., 8:15, e.g., 9:5, e.g., 9:7, e.g., 9:8, e.g., 9:10, e.g., 9:11, e.g., 9:13, e.g., 9:14, e.g., 9:16, e.g., 9:17.

In some embodiments, the alcohols are selected from aliphatic alcohols, such as methanol, ethanol, isopropanol, n-butanol, isobutanol, and tert-butanol, further for example methanol, ethanol, and isopropanol.

In some embodiments, the ketones are selected from acetone, butanone, pentanone, methyl butyl ketone, and methyl isobutyl ketone, further for example, acetone and butanone.

In some embodiments, nitrile is acetonitrile.

In some embodiments, the weight ratio of the compound of formula (1) to the organic solvent is 1:2-1:6, e.g., 1:2-1:5, e.g., 1:2-1:4, e.g., 1:2-1:3, e.g., 1:3-1:5, e.g., 1:3-1:4, e.g., 1:4-1:5, e.g., 1:2-1:6, e.g., 1:3-1:6, e.g., 1:4-1:6, e.g., 1:5-1:6, e.g., 1:3, 1:3.5, 1:4, 1:4.5, 1:5, 1:5.5, 1:6 etc.

In some embodiments, the weight ratio of the compound of formula (1) to water is 1:3-1:8, e.g., 1:3-1:7, e.g., 1:3-1:6, e.g., 1:3-1:5, e.g., 1:3-1:4, e.g., 1:4-1:5, e.g., 1:4-1:6, e.g., 1:4-1:7, e.g., 1:4-1:8, e.g., 1:5-1:6, e.g., 1:5-1:7, e.g., 1:5-1:8, e.g., 1:3, 1:3.5, 1:4, 1:4.5, 1:5, 1:5.5, 1:6, 1:6.5, 1:7, 1:7.5, 1:8 etc.

In some embodiments, the filtration can be carried out by suction filtration.

In some embodiments, the filtration can be carried out by suction filtration, and a filter cake obtained by the suction filtration can be rinsed with a solvent. In some embodiments, the solvent used for rinsing is a mixed solvent of an organic solvent (for example, alcohols, ketones, nitriles, etc.) and water; in some embodiments, the solvent used for rinsing is an organic solvent (for example, alcohols, ketones, nitriles, etc.); in some embodiments, the solvent used for rinsing is water. In some embodiments, the solvent used for rinsing is a mixed solvent of an alcohol and water, water or an alcohol.

In some embodiments, the solvent used for rinsing is a mixed solvent of methanol and water. In some embodiments, the solvent used for rinsing is a mixed solvent of ethanol and water. In some embodiments, the solvent used for rinsing is a mixed solvent of propanol and water. In some embodiments, the solvent used for rinsing is a mixed solvent of isopropanol and water; in some embodiments, the solvent used for rinsing is methanol, ethanol or isopropanol.

In some embodiments, the solvent used for rinsing is a mixed solvent of an alcohol and water, and the volume ratio of the alcohol to water is 1:5-5:1, e.g., 1:4-4:1, e.g., 1:3-3:1, e.g., 1:2-2:1, e.g., 4:5-5:4, e.g., 1:2, e.g., 1:1, e.g., 3:2, e.g., 3:4, e.g., 3:5, e.g., 4:3, e.g., 4:5, e.g., 2:3, e.g., 5:3, e.g., 5:4, e.g., 5:6, e.g., 5:7, e.g., 5:8, e.g., 5:9, e.g., 6:5, e.g., 6:7, e.g., 6:10, e.g., 6:11, e.g., 7:4, e.g., 7:5, e.g., 7:6, e.g., 7:8, e.g., 7:9, e.g., 7:10, e.g., 7:11, e.g., 7:12, e.g., 7:13, e.g., 8:5, e.g., 8:7, e.g., 8:9, e.g., 8:11, e.g., 8:13, e.g., 8:14, e.g., 8:15, e.g., 9:5, e.g., 9:7, e.g., 9:8, e.g., 9:10, e.g., 9:11, e.g., 9:13, e.g., 9:14, e.g., 9:16, e.g., 9:17.

In some embodiments, the solvent used for rinsing is a mixed solvent of an alcohol and water, and the volume ratio of the alcohol to water is not less than 1:1, e.g., 1:1, e.g., 2:1, e.g., 3:1, e.g., 4:1, e.g., 5:1, e.g., 3:2, e.g., 4:3, e.g., 5:2, e.g., 5:3, e.g., 5:4, e.g., 6:5, e.g., 7:4, e.g., 7:5, e.g., 7:6, e.g., 8:5, e.g., 8:7, e.g., 9:5, e.g., 9:7, e.g., 9:8 etc.

In some embodiments, the solvent used for rinsing is a mixed solvent of ethanol and water, and the volume ratio of ethanol to water is not less than 1:1, e.g., 1:1, e.g., 2:1, e.g., 3:1, e.g., 4:1, e.g., 5:1, e.g., 3:2, e.g., 4:3, e.g., 5:2, e.g., 5:3, e.g., 5:4, e.g., 6:5, e.g., 7:4, e.g., 7:5, e.g., 7:6, e.g., 8:5, e.g., 8:7, e.g., 9:5, e.g., 9:7, e.g., 9:8 etc.

In some embodiments, the preparation method for crystal form B of the compound of formula (1) can be expressed as involving:
mixing the compound of formula (1) with an aliphatic solvent, heating the mixture to 40-80° C., adding water, continuing to heat the mixture to 40-80° C., performing gradient cooling at 3-8° C./h to 10-30° C., and performing filtration and drying to obtain crystal form B of the compound.

In some embodiments, the preparation method for crystal form B of the compound of formula (1) can be expressed as involving:
mixing the compound of formula (1) with ethanol, heating the mixture to 50-70° C., adding water, continuing to heat the mixture to 50-80° C., performing gradient cooling at 4-7° C./h to 10-30° C., and performing filtration and drying to obtain crystal form B of the compound.

In some embodiments, the preparation method for crystal form B of the compound of formula (1) can be expressed as involving:
mixing the compound of formula (1) with ethanol, heating the mixture to 55-70° C., adding water, continuing to heat the mixture to 60-80° C., performing gradient cooling at 5-7° C./h to 20-30° C., and performing filtration and drying to obtain crystal form B of the compound.

The present invention further provides a method for preparing crystal form A of a compound of formula (1), the method comprising:
mixing the compound of formula (1) with an organic solvent, stirring the mixture, heating the mixture to a first temperature, filtering the mixture, adding water, continuing to stir and heat the mixture to a second temperature, adding a slurry of seed crystal A, performing gradient I cooling to 50-55° C., stirring, and gradient II cooling to room temperature, and performing filtration and drying to obtain crystal form A.

In some embodiments, the first temperature is selected from 40-80° C., preferably 60-80° C.; and the second temperature is selected from 50-80° C., preferably 60-80° C.

In some embodiments, the gradient I cooling is selected from 1-6° C./h, e.g., 2-6° C./h, e.g., 3-6° C./h, e.g., 4-6° C./h, e.g., 5-6° C./h, e.g., 1-5° C./h, e.g., 2-5° C./h, e.g., 3-5° C./h, e.g., 4-5° C./h, e.g., 3-4° C./h.

In some embodiments, the gradient II cooling is selected from 1-12° C./h, e.g., 2-10° C./h, e.g., 3-10° C./h, e.g., 3-9° C./h, e.g., 3-8° C./h, e.g., 3-7° C./h, e.g., 3-6° C./h, e.g., 3-5° C./h, e.g., 3-4° C./h, e.g., 4-10° C./h, e.g., 4-9° C./h, e.g., 4-8° C./h, e.g., 4-7° C./h, e.g., 4-6° C./h, e.g., 4-5° C./h, e.g., 5-10° C./h, e.g., 5-9° C./h, e.g., 5-8° C./h, e.g., 5-7° C./h, e.g., 5-6° C./h, e.g., 6-10° C./h, e.g., 6-9° C./h, e.g., 6-8° C./h, e.g., 6-7° C./h, e.g., 7-10° C./h, e.g., 7-9° C./h, e.g., 7-8° C./h, e.g., 8-10° C./h, e.g., 8-9° C./h, e.g., 9-10° C./h, e.g., 5-12° C./h, e.g., 6-12° C./h, e.g., 8-12° C./h, e.g., 7-12° C./h, e.g., 9-12° C./h, e.g., 10-12° C./h. In some embodiments, for gradient cooling, different temperatures can be selected for cooling according to precipitation in a sample, and 3° C./h, 5° C./h, 7° C./h, and 10° C./h are respectively selected for cooling.

In some embodiments, the organic solvent is selected from alcohol solvents and ketone solvents, preferably methanol, absolute ethanol, and acetone.

In some embodiments, the volume ratio of the organic solvent to water is selected from 1:6-6:1, e.g., 1:5-5:1, e.g., 1:4-4:1, e.g., 1:3-3:1, e.g., 1:2-2:1, e.g., 4:5-5:4, e.g., 1:2, e.g., 1:1, e.g., 3:2, e.g., 3:4, e.g., 3:5, e.g., 4:3, e.g., 4:5, e.g., 2:3, e.g., 5:3, e.g., 5:4, e.g., 5:6, e.g., 5:7, e.g., 5:8, e.g., 5:9, e.g., 6:5, e.g., 6:7, e.g., 6:10, e.g., 6:11, e.g., 7:4, e.g., 7:5, e.g., 7:6, e.g., 7:8, e.g., 7:9, e.g., 7:10, e.g., 7:11, e.g., 7:12, e.g., 7:13, e.g., 8:5, e.g., 8:7, e.g., 8:9, e.g., 8:11, e.g., 8:13, e.g., 8:14, e.g., 8:15, e.g., 9:5, e.g., 9:7, e.g., 9:8, e.g., 9:10, e.g., 9:11, e.g., 9:13, e.g., 9:14, e.g., 9:16, e.g., 9:17.

The present invention further provides a method for preparing crystal form X of a compound of formula (1), the method comprising:

mixing the compound of formula (1) with an organic solvent, heating the mixture until dissolved, and performing cooling to room temperature, filtration and drying to obtain crystal form X.

In some embodiments, it is heated to for example 40-80° C., e.g., 60-80° C.

In some embodiments, the organic solvent is selected from alcohol solvents, ketone solvents, and nitrile solvents, and is preferably methanol, absolute ethanol, acetone, acetonitrile, and propionitrile, preferably acetonitrile and propionitrile.

In some embodiments, the volume ratio of the organic solvent to water is selected from 1:6-6:1, e.g., 1:5-5:1, e.g., 1:4-4:1, e.g., 1:3-3:1, e.g., 1:2-2:1, e.g., 4:5-5:4, e.g., 1:2, e.g., 1:1, e.g., 3:2, e.g., 3:4, e.g., 3:5, e.g., 4:3, e.g., 4:5, e.g., 2:3, e.g., 5:3, e.g., 5:4, e.g., 5:6, e.g., 5:7, e.g., 5:8, e.g., 5:9, e.g., 6:5, e.g., 6:7, e.g., 6:10, e.g., 6:11, e.g., 7:4, e.g., 7:5, e.g., 7:6, e.g., 7:8, e.g., 7:9, e.g., 7:10, e.g., 7:11, e.g., 7:12, e.g., 7:13, e.g., 8:5, e.g., 8:7, e.g., 8:9, e.g., 8:11, e.g., 8:13, e.g., 8:14, e.g., 8:15, e.g., 9:5, e.g., 9:7, e.g., 9:8, e.g., 9:10, e.g., 9:11, e.g., 9:13, e.g., 9:14, e.g., 9:16, e.g., 9:17. In order to analyze the obtained crystal, an X-ray diffraction crystallographic analysis method, differential scanning calorimetry (DSC), thermogravimetric analysis (TGA), etc. can generally be employed.

When X-ray powder diffraction is used to determine the crystal form of the present invention, sometimes due to the determination instrument or determination conditions, there may be a slight measurement error for the measured peak, and the crystal of a spectral peak within the error range is also included in the crystal of the present invention. Therefore, this error should be taken into account when determining the crystal structure, and therefore, the applicant considers the error range within ±0.2° when determining the angle 2θ. In addition, the X-ray powder diffraction (XRPD) main peaks are the same for different samples of a particular crystalline form, but the secondary peaks may vary.

Differential scanning calorimetry (DSC) is a technique that measures the energy difference between a sample and an inert reference (commonly ($\alpha$-$Al_2O_3$) as a function of temperature by continuous heating or cooling under program control. The melting/endothermic peak heights of a DSC curve depend on many factors related to sample preparation and instrument geometry, and peak positions are relatively insensitive to experimental details. Accordingly, in some embodiments, the crystal form of the present invention is characterized by a DSC pattern having characteristic peak positions, substantially as shown in the DSC pattern provided in the accompanying drawings of the present invention. In addition, the DSC patterns may have experimental errors, and the peak positions and peak values in the DSC patterns may be slightly different between different instruments and different samples, so the peak positions or peak values of the DSC endothermic peaks cannot be regarded as absolute. Depending on the conditions of the instruments used in this experiment, in some embodiments, there is an error tolerance of 2° C. for the melting peak.

The present invention further provides a pharmaceutical composition comprising crystal form A, crystal form B, crystal form X or crystal form 4 of the compound of formula (1) mentioned above, and one or more second therapeutic agents, wherein optionally, the pharmaceutical composition further comprises one or more pharmaceutically acceptable carriers and/or diluents.

The second therapeutic agent includes, but is not limited to, antimetabolites, growth factor inhibitors, antibodies, mitotic inhibitors, antitumor hormones, alkylating agents, metal platinums, immunosuppressants, purine analogues, antibiotics, adrenocortical inhibitors or enzyme inhibitors.

The present invention further provides a pharmaceutical formulation comprising crystal form A, crystal form B, crystal form X or crystal form 4 of the compound of formula (1) mentioned above, and one or more pharmaceutically acceptable carriers and/or diluents, wherein the pharmaceutical formulation is any clinically or pharmaceutically acceptable dosage form.

In some embodiments of the present invention, the pharmaceutical formulation described above is administered to a patient or subject in need of such a treatment orally, parenterally, rectally, by pulmonary administration, etc. When used for oral administration, it can be formulated into a conventional solid formulation, such as tablets, capsules, pills and granules; and it may also be formulated into an oral liquid formulation, such as an oral solution, an oral suspension and a syrup. In the case of formulation into an oral formulation, suitable fillers, binders, disintegrants, lubricants, etc. can be added. For parenteral administration, it can be formulated into an injection, including an injection solution, a sterile powder for injection and a concentrated solution for injection. In the case of formulation into an injection, it can be produced by a conventional method in the existing pharmaceutical field. When the injection is formulated, no additive can be added, or an appropriate additive can be added depending on the properties of the drug. For rectal administration, it can be formulated into a suppository etc. For pulmonary administration, it can be formulated into an inhalant, a spray, etc.

The present invention further provides a method for the treatment and/or prevention of an ALK-mediated disease, the method comprising administering to a subject in need thereof an effective amount of crystal form A, crystal form B, crystal form X or crystal form 4 of 5-chloro-$N^4$-(2-(isopropylsulfonyl)phenyl)-$N^2$-(7-methyl-8-(piperidin-4-yl)-2,3-dihydrobenzo[b][1,4]d ioxin-5-yl)pyrimidine-2,4-diamine (compound of formula (1)).

In one embodiment, the ALK-mediated disease is cancer, e.g., brain tumor, lung cancer, non-small cell lung cancer, squamous cell carcinoma, bladder cancer, gastric cancer, ovarian cancer, peritoneal cancer, pancreatic cancer, breast cancer, head and neck cancer, cervical cancer, endometrial cancer, colorectal cancer, liver cancer, hepatoblastoma, papillary renal cell tumor, head and neck squamous cell tumor, nephroblastoma, kidney cancer, esophageal adenocarcinoma, esophageal squamous cell carcinoma, non-Hodgkin lymphoma, central nervous system tumors, female reproductive tract cancer, carcinoma in situ, lymphoma, neuroblastoma, neurofibromatosis, thyroid cancer, bone cancer, skin cancer, brain cancer, colon cancer, testicular cancer, small cell lung cancer, gastrointestinal stromal tumor, prostate tumor, mast cell tumor, multiple myeloma, melanoma, glioma, astrocytoma, neuroblastoma, sarcoma or glioma.

In one embodiment, the ALK-mediated disease is a non-cancer-related disease, e.g., selected from benign hyperplasia of the skin or prostate.

The present invention further provides the use of crystal form A, crystal form B, crystal form X or crystal form 4 of the compound of formula (1) in the preparation of a medicament for the treatment and/or prevention of an ALK-mediated disease in a subject.

In one embodiment, the ALK-mediated disease is cancer, e.g., brain tumor, lung cancer, non-small cell lung cancer, squamous cell carcinoma, bladder cancer, gastric cancer, ovarian cancer, peritoneal cancer, pancreatic cancer, breast cancer, head and neck cancer, cervical cancer, endometrial cancer, colorectal cancer, liver cancer, hepatoblastoma, papillary renal cell tumor, head and neck squamous cell tumor, nephroblastoma, kidney cancer, esophageal adenocarcinoma, esophageal squamous cell carcinoma, non-Hodgkin lymphoma, central nervous system tumors, female reproductive tract cancer, carcinoma in situ, lymphoma, neuroblastoma, neurofibromatosis, thyroid cancer, bone cancer, skin cancer, brain cancer, colon cancer, testicular cancer, small cell lung cancer, gastrointestinal stromal tumor, prostate tumor, mast cell tumor, multiple myeloma, melanoma, glioma, astrocytoma, neuroblastoma, sarcoma or glioma.

In one embodiment, the ALK-mediated disease is a non-cancer-related disease, e.g., selected from benign hyperplasia of the skin or prostate.

The present invention further provides crystal form A, crystal form B, crystal form X or crystal form 4 of the compound of formula (1) for the treatment and/or prevention of an ALK-mediated disease in a subject.

In one embodiment, the ALK-mediated disease is cancer, e.g., brain tumor, lung cancer, non-small cell lung cancer, squamous cell carcinoma, bladder cancer, gastric cancer, ovarian cancer, peritoneal cancer, pancreatic cancer, breast cancer, head and neck cancer, cervical cancer, endometrial cancer, colorectal cancer, liver cancer, hepatoblastoma, papillary renal cell tumor, head and neck squamous cell tumor, nephroblastoma, kidney cancer, esophageal adenocarcinoma, esophageal squamous cell carcinoma, non-Hodgkin lymphoma, central nervous system tumors, female reproductive tract cancer, carcinoma in situ, lymphoma, neuroblastoma, neurofibromatosis, thyroid cancer, bone cancer, skin cancer, brain cancer, colon cancer, testicular cancer, small cell lung cancer, gastrointestinal stromal tumor, prostate tumor, mast cell tumor, multiple myeloma, melanoma, glioma, astrocytoma, neuroblastoma, sarcoma or glioma.

In one embodiment, the ALK-mediated disease is a non-cancer-related disease, e.g., selected from benign hyperplasia of the skin or prostate.

The present invention further provides a composition of crystal form A, crystal form B, crystal form X or crystal form 4 of the compound of formula (1) and one or more additional drugs, wherein these additional drugs may be administered simultaneously or sequentially with crystal form A, crystal form B, crystal form X or crystal form 4 of the compound of formula (1), for the treatment and/or prevention of an ALK-mediated disease in a subject.

In one embodiment, the ALK-mediated disease is cancer, e.g., brain tumor, lung cancer, non-small cell lung cancer, squamous cell carcinoma, bladder cancer, gastric cancer, ovarian cancer, peritoneal cancer, pancreatic cancer, breast cancer, head and neck cancer, cervical cancer, endometrial cancer, colorectal cancer, liver cancer, hepatoblastoma, papillary renal cell tumor, head and neck squamous cell tumor, nephroblastoma, kidney cancer, esophageal adenocarcinoma, esophageal squamous cell carcinoma, non-Hodgkin lymphoma, central nervous system tumors, female reproductive tract cancer, carcinoma in situ, lymphoma, neuroblastoma, neurofibromatosis, thyroid cancer, bone cancer, skin cancer, brain cancer, colon cancer, testicular cancer, small cell lung cancer, gastrointestinal stromal tumor, prostate tumor, mast cell tumor, multiple myeloma, melanoma, glioma, astrocytoma, neuroblastoma, sarcoma or glioma.

In one embodiment, the ALK-mediated disease is a non-cancer-related disease, e.g., selected from benign hyperplasia of the skin or prostate.

In the present invention, the subject may be any animal, preferably a mammal such as bovine, equine, porcine, canine, feline, rodent, and primate. Among them, a particularly preferred subject is human.

The crystal form provided by the present invention may contain a solvent. In some cases, the solvent contained in the crystal form of the compound contributes to the internal stability of the crystalline form. Common solvents include water and organic solvents, such as alcohol solvents, nitrile solvents, and ketone solvents as described hereinabove. As long as the crystal form containing a certain amount of water or other solvents has any of the features of the crystal form of the present invention, it should be considered to be included in the scope of the present invention.

In the present disclosure, unless otherwise specified, scientific and technical terms used herein have the meanings commonly understood by those skilled in the art. In addition, for better understanding of the present invention, definitions and explanations of some terms are provided below.

As described herein, the term "effective amount" refers to an amount sufficient to achieve the desired therapeutic or prophylactic effect, e.g., an amount that achieves alleviation of symptoms associated with the disease to be treated.

The term "treatment" as described herein refers to alleviation or elimination of the targeted disease state or condition. If a subject receives a therapeutic amount of the crystal form or a pharmaceutical composition thereof according to the method described herein and the subject exhibits one or more indications and symptoms that are observable and/or detectable decrease or improvement, the subject is successfully "treated". It is also to be understood that the treatment of the disease state or condition includes not only complete treatment but also a treatment that is incomplete but achieves some biologically or medically relevant results.

The term "about" as used herein has its conventional meaning. In some embodiments, when related to a numerical value, it is understood to be +10%, or ±5%, or +2%, or ±1%, or +0.5%, or ±0.1% of the numerical value. In other embodiments, the word "about" is omitted to indicate a precise value.

The term "substantially as shown in FIG." as described herein is used interchangeably with "substantially the same as FIG." and refers to at least 50%, or at least 60%, or at least 70%, or at least 80%, or at least 90%, or at least 95%, or at least 99% of peaks in an X-ray powder diffraction pattern, differential scanning calorimetry analysis diagram or thermogravimetric analysis diagram being shown in the figure.

The main advantages of crystal forms A and B of the compound of formula (1) of the present invention include:
(1) the preparation method for crystal forms A and B of the compound 5-chloro-$N^4$-(2-(isopropylsulfonyl)phenyl)-$N^2$-(7-methyl-8-(piperidin-4-yl)-2,3-dihydrobenzo[b][1,4]dioxin-5-yl)pyrimidine-2,4-diamine provided by the present invention is easy to operate and suitable for industrial production;

(2) crystal forms A and B provided by the present invention have good properties and convenience for detection, formulation, transportation and storage;
(3) crystal forms A and B provided by the present invention have a high purity, few residual solvent, a relatively high solubility, a good stability, easy quality control, a good fluidity, and easy formulation;
(4) form A and form B provided by the present invention have excellent bioavailability; and (5) crystal forms A and B provided by the present invention have good inhibitory effects on both ALK and ROS1 kinases and can be used for the treatment and/or prevention of an ALK-mediated disease.

DETAILED DESCRIPTION OF EMBODIMENTS

Figure 1:
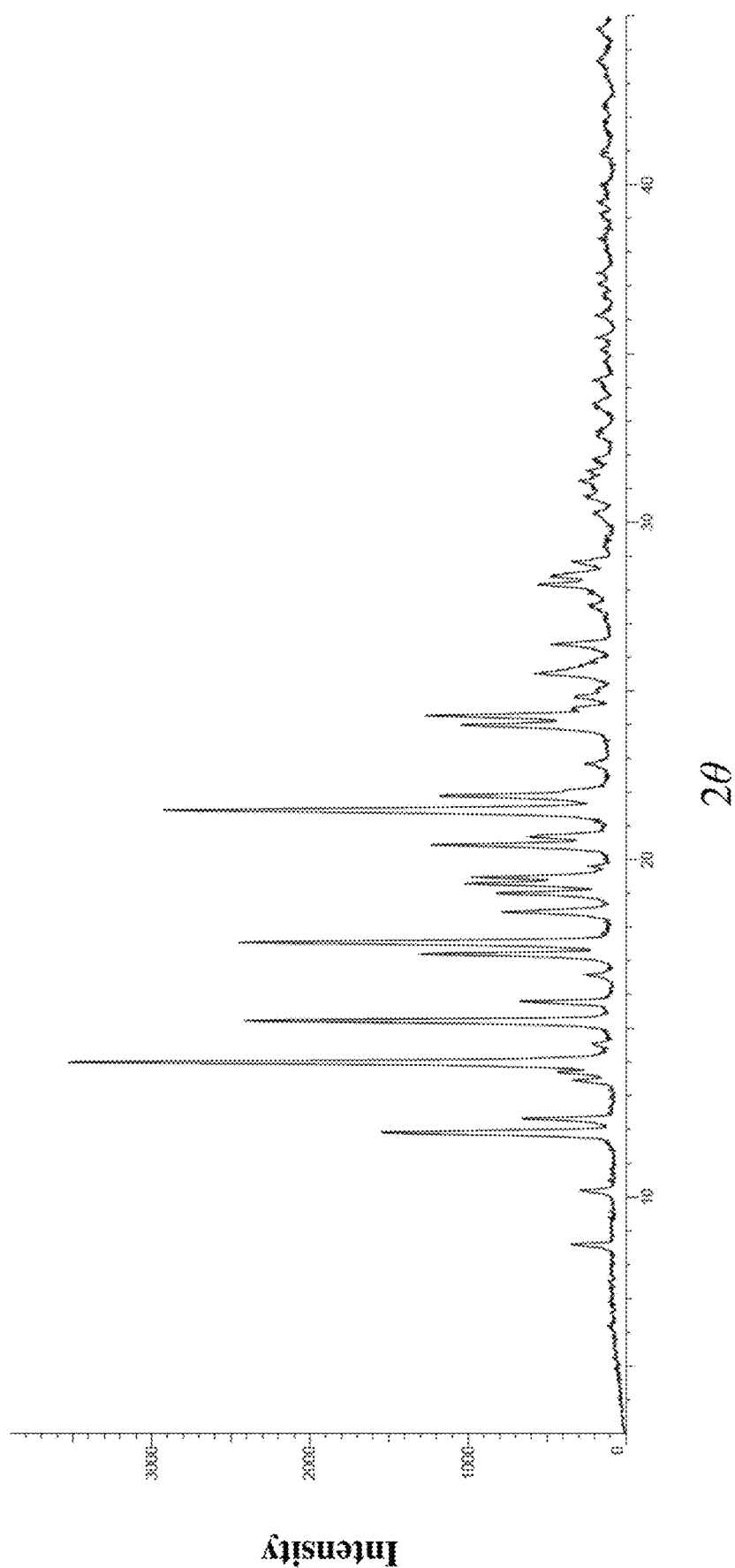
FIG. 1 is an X-ray powder diffraction pattern of crystal form B of the compound of formula (1), wherein the ordinate represents the diffraction intensity and the abscissa represents the diffraction angle (2θ).

The above content of the present invention will be further described in detail below by the specific implementation in the form of examples. However, it should not be construed that the scope of the above-mentioned subject matter of the present invention is only limited to the following examples. Any technologies implemented based on the above content of the present invention all belong to the scope of the present invention.

The definitions represented by the following abbreviations are as follows:

DMSO: dimethyl sulfoxide
NMP: N-methylpyrrolidone
THF: tetrahydrofuran
IPAc: isopropyl acetate Example 1: Preparation of Crystal Form B of Compound of Formula (1)

Method 1: 10.0 g of the compound of formula (1) and 40 g of absolute ethanol were added to a 250 ml three-necked flask, and the mixture was mechanically stirred at a rotational speed of 150 r/min, whereupon the system became a suspension. An oil bath was heated to 62° C., and the system was dissolved clear. When heating continued to an inner temperature of 68° C. (first temperature), purified water (50 g) was dropwise added, and after the dropwise addition was complete, the system was turbid, the inner temperature was 59° C., and heating continued with stirring. The internal temperature was 65° C. and the system was dissolved clear again. The inner temperature was 75° C. (second temperature) and began to decrease, the temperature was then lowered at 5-7° C./h, the system was lowered to 26° C., suction filtration was performed, and the filter cake was rinsed with 10 ml of a mixed solvent (5 ml of absolute ethanol and 5 ml of water). The filter cake was transferred to a carton for natural drying to obtain a sample of crystal form B.

Other methods: By adjusting the reaction conditions according to the following table, crystal form B of the compound of formula (1) can also be obtained.

| | | | | |
|---|---|---|---|---|
| Amount of starting material (g) | 2 | 2 | 2 | 2 |
| Temperature before cooling (° C.) | 72 | 72 | 72 | 72 |

| | | | | |
|---|---|---|---|---|
| Stirring method | Mechanical stirring | Mechanical stirring | Mechanical stirring | Mechanical stirring |
| Cooling method | Gradient | Gradient | Gradient | Gradient |
| EtOH/H$_2$O (V/V) | 1:1 (10 ml:10 ml) | 1:1 (10 ml:10 ml) | 1:0.8 (10 ml:8 ml) | 1:0.5 (10 ml:5 ml) |
| To add a seed crystal? | No | Yes | No | Yes |
| Starting temperature for cooling (° C.) | 72 | 72 | 69 | 66 |
| Total reaction time from the start of cooling to treatment (h) | 20 | 20 | 20 | 20 |
| Treatment method | Suction filtration and drying at 50° C. | Suction filtration and drying at 50° C. | Suction filtration and drying at 50° C. | Suction filtration and drying at 50° C. |
| Obtained crystal form | Crystal form B | Crystal form B | Crystal form B | Crystal form B |
| Yield | 81.3% | 87.3% | 80.3% | 83.0% |

Example 2: Preparation of Crystal Form a of Compound of Formula (1)

A compound of formula (1) (15.00 g) was added to a 250 ml three-necked flask, 60.00 g of absolute ethanol was added, the mixture was stirred and heated to an inner temperature of 66° C. (first temperature) at which the raw material was dissolved clear; when the inner temperature was 75° C., hot filtration was carried out (0.45 um organic filter membrane), the temperature was maintained at 70-75° C. for 0.5 h, and purified water (57 ml) was then dropwise added over 5 min; when the inner temperature was 62° C., the mixture was stirred and heated to 72° C. (second temperature), maintained at 70-72° C. for 0.5 h, and a slurry of seed crystal A was added, when the internal temperature was 71° C.; and slow cooling began, the mixture was cooled to 55° C. within 3 h, maintained at 55-57° C. 18 h under stirring, cooled to 24° C. for 3 h, maintained at 20-25° C. for 2 h under stirring, and filtered, the filter cake was rinsed with 30 ml of purified water, and after vacuum drying at 50° C. for 18 h, 13.46 g of a crystal form A product was obtained, with a yield of 89.73%.

Preparation of slurry of seed crystal A: Crystal form A was taken and weighed 150 mg, it was ground, 3.0 ml of purified water and 3.75 ml of absolute ethanol were added, and the mixture was shaken uniform and sonicated for about 1 min.

Example 3: Preparation of Crystal Form X of Compound of Formula (1)

35 g of the compound of formula (I) was taken and dissolved in acetonitrile (350 mL), the mixture was heated to 70° C. for dissolution and cooled to 25° C. at which a solid precipitated, and after filtration and vacuum drying, form X was obtained as a white solid.

Example 4: Preparation of Crystal Form 4 of Compound of Formula (1)

3 g of crystal form B of the compound of formula (1) and 15 ml of absolute ethanol were added to a 100 ml three-necked flask, and the mixture was mechanically stirred at a rotational speed of 100 r/min and dissolved clear. An oil bath was heated to 72° C. and kept under stirring, and water (7.5 ml) was added dropwise to the system; and after the dropwise addition was complete, the system was turbid, stirring and heating continued, the internal temperature was 69° C., and the solution was dissolved clear. Cooling was performed at 5° C./2 h. The internal temperature was 64° C., and no turbidity was found. The internal temperature was 34° C. and the system was turbid, which was stirred for crystal precipitation. Suction filtration was performed and a filter cake was collected. The filter cake was transferred to a carton for natural drying to obtain a sample of crystal form 4.

The DSC of this crystal form showed that the melting point of this crystal form was 123° C., and crystal form transformation into crystal form B with a melting point peak value of 197.7° C. then occurred during heating. In addition, the TGA characterization results showed that the crystal form had a weight loss of about 3% at 100° C. and that after drying at 100° C., the measured moisture of the sample was reduced to 2%. $^1$HNMR showed that the content of $CH_3CH_2OH$ was extremely low, so it was speculated that the weight loss was adsorbed water.

Transformation of crystal form 4 to crystal form B: 200 mg of a sample of crystal form 4 was taken and put into a 25 ml single-neck flask, and the flask was put into an oil bath and directly heated to 190° C. (oil bath temperature) at which the solid powder melted to form a lumpy solid. After cooling, the solid was taken for XRPD detection, and the results indicated crystal form B. X-ray powder diffraction determination, differential scanning calorimetry determination and thermogravimetric analysis on the crystal forms prepared by the methods listed in Examples 1-4:

X-Ray Powder Diffraction Determination

The crystal structures of the present invention are not limited to crystal structures that provide X-ray powder diffraction patterns completely identical to those depicted in the accompanying drawings disclosed in the present application. Any crystal structures having an X-ray powder diffraction pattern substantially identical to those disclosed in the accompanying drawings are all included within the scope of the present invention.

X-ray powder diffraction determination conditions:
X-ray reflection parameters: Cu, Kα
Incident slit: 0.6 mm
Divergence slit: 8 mm
Scan mode: continuous
Scan range: 3.0-45.0 degrees
Sampling step size: 0.02 degrees
Scan time per step: 19.8 s
Detector angle: 2.0 degrees The X-ray powder diffraction pattern of crystal form B of the compound of formula (1) prepared in Example 1 was shown in FIG. 1, and the crystal form had peaks at the following diffraction angles 2θ (°): 8.6±0.2°, 10.2±0.2°, 11.9±0.2°, 12.3±0.2°, 14.0±0.2°, 15.2±0.2°, 15.8±0.2°, 17.2±0.2°, 17.5±0.2° 18.5±0.2°, 19.0±0.2°, 19.3±0.2°, 20.4±0.2°, 20.7±0.2°, 21.5±0.2°, 21.9±0.2°, 24.0±0.2°, and 24.3±0.2°.

Figure 4:
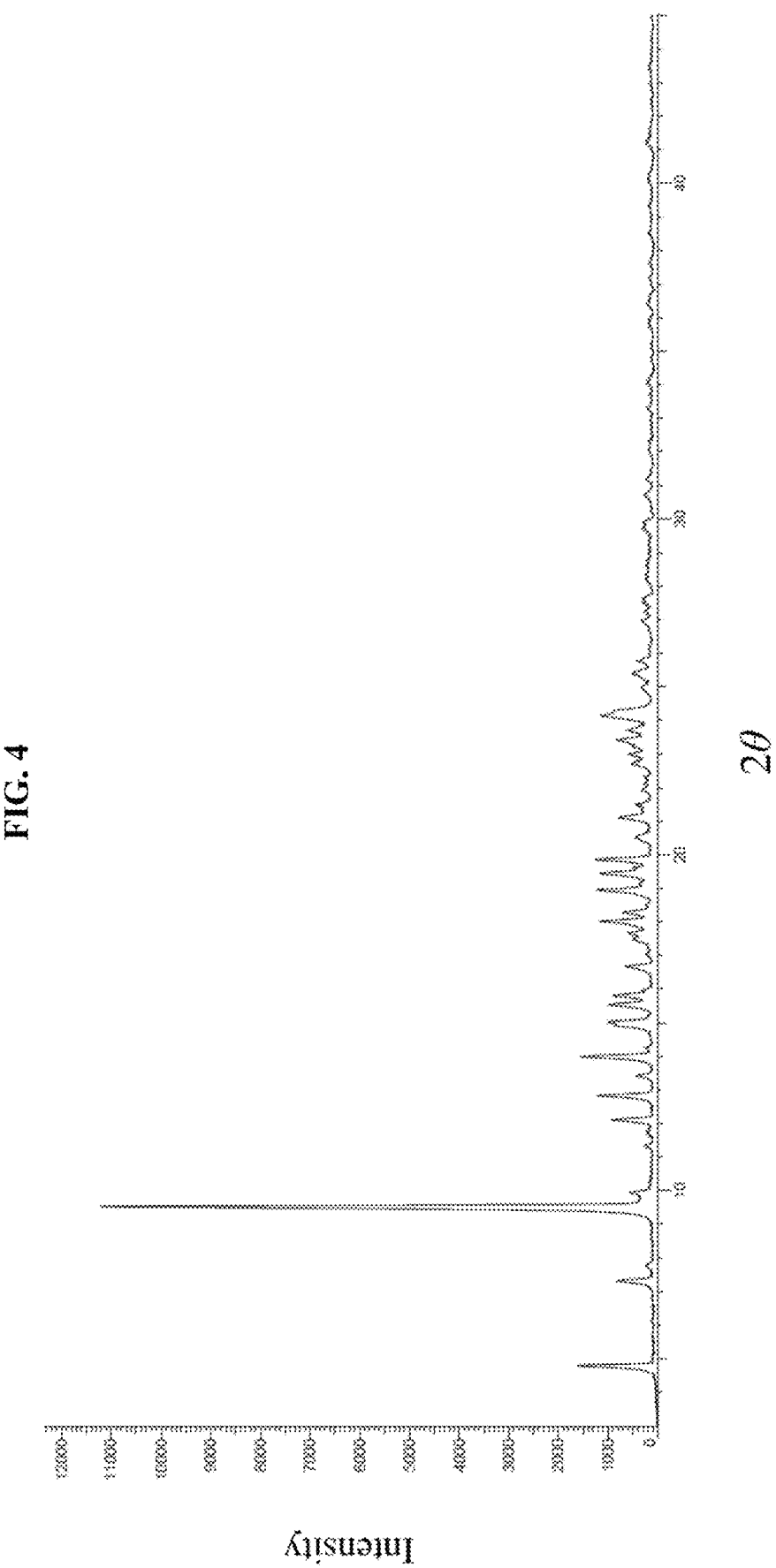
FIG. 4 is an X-ray powder diffraction pattern of crystal form A of the compound of formula (1), wherein the ordinate represents the diffraction intensity (intensity), and the abscissa represents the diffraction angle (2θ).

The X-ray powder diffraction pattern of crystal form A of the compound of formula (1) prepared in Example 2 was shown in FIG. 4, and the crystal form had peaks at the following diffraction angles 2θ (°): 4.8±0.2°, 7.3±0.2°, 9.6±0.2°, 9.9±0.2°, 12.1±0.2°, 12.9±0.2°, 13.5±0.2°, 14.0±0.2°, 15.0±0.2°, 15.6±0.2°, 15.9±0.2°, 16.7±0.2°, 18.0±0.2°, 18.3±0.2°, 19.0±0.2°, 19.5±0.2°, 19.9±0.2°, 20.6±0.2°, and 21.2±0.2°.

Figure 7:
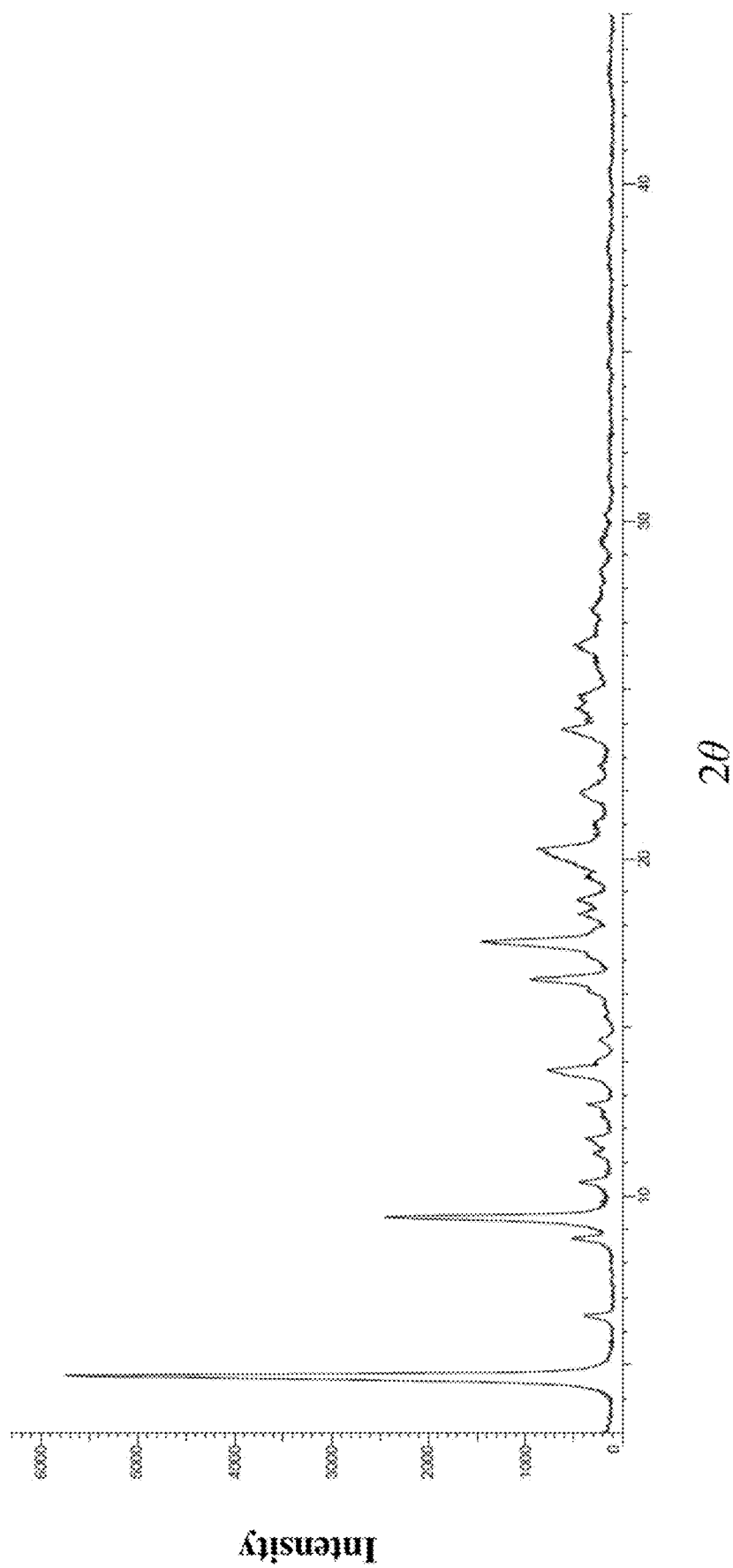
FIG. 7 is an X-ray powder diffraction pattern of crystal form X of the compound of formula (1), wherein the ordinate represents the diffraction intensity (intensity), and the abscissa represents the diffraction angle (2θ).

The X-ray powder diffraction pattern of crystal form X of the compound of formula (1) prepared in Example 3 was shown in FIG. 7, and the crystal form had peaks at the following diffraction angles 2θ (°): 4.7±0.2°, 6.4±0.2°, 8.7±0.2°, 9.4±0.2°, 10.4±0.2°, 13.7±0.2°, 16.4±0.2°, 17.5±0.2°, 18.4±0.2°, 18.8±0.2°, and 20.2±0.2°.

Figure 10:
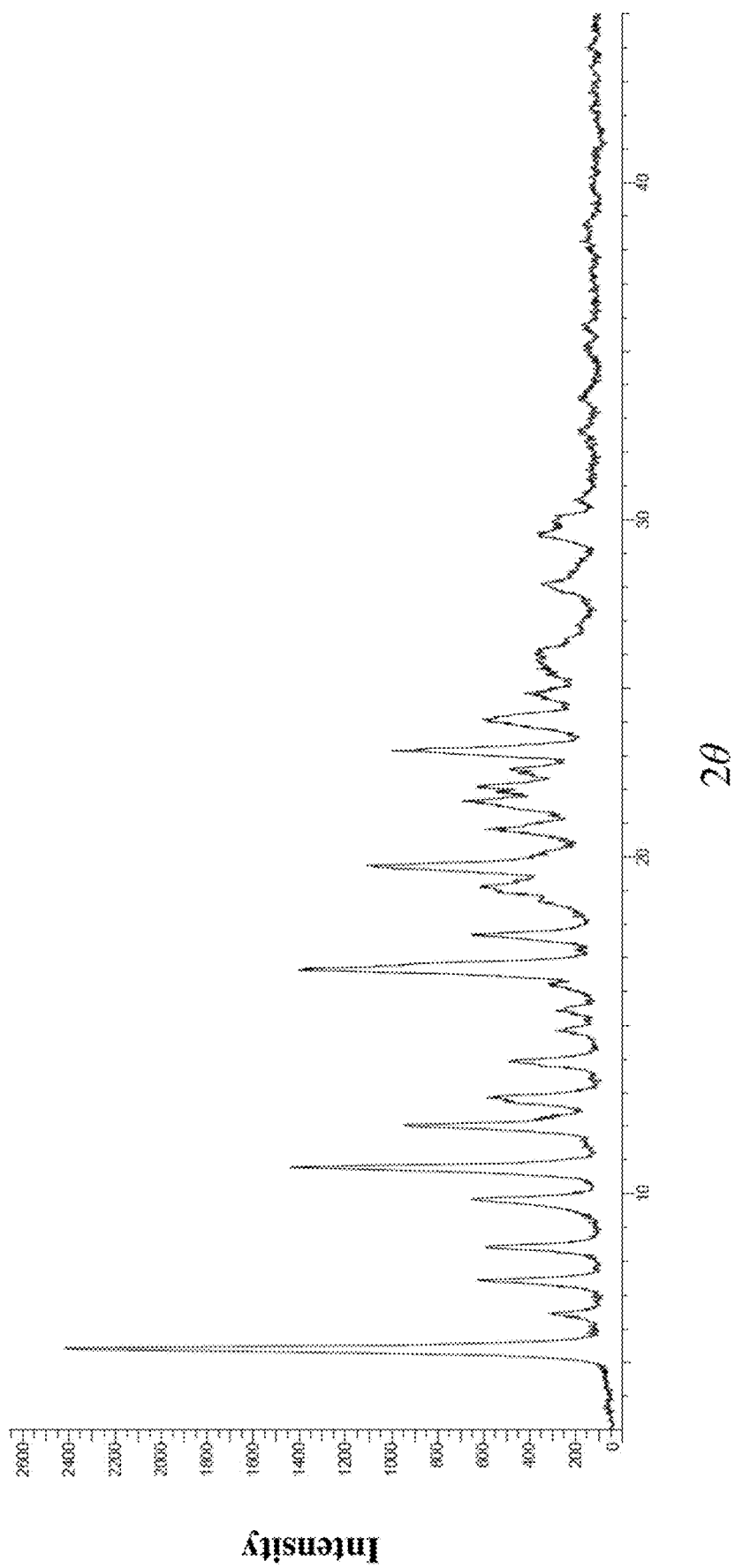
FIG. 10 is an X-ray powder diffraction pattern of crystal form 4 of the compound of formula (1), wherein the ordinate represents the diffraction intensity (intensity), and the abscissa represents the diffraction angle (2θ).

The X-ray powder diffraction pattern of crystal form 4 of the compound of formula (1) prepared in Example 4 was shown in FIG. 10, and the crystal form had peaks at the following diffraction angles 2θ (°): 5.4±0.2°, 6.4±0.2°, 7.4±0.2°, 8.4±0.2°, 9.8±0.2°, 10.8±0.2°, 12.0±0.2°, 12.8±0.2°, 13.9±0.2°, 16.7±0.2°, 17.7±0.2°, 19.7±0.2°, and 23.1±0.2°.

Differential Scanning Calorimetry

The solid-state thermal properties of the crystal forms of the compound of formula (1) were investigated by differential scanning calorimetry (DSC).

Determination conditions: Purging with nitrogen at 50 ml/min, data collection at a heating rate of 10° C./min between 25° C. and 230° C., and plotting with endothermic peaks pointing down.

Figure 2:
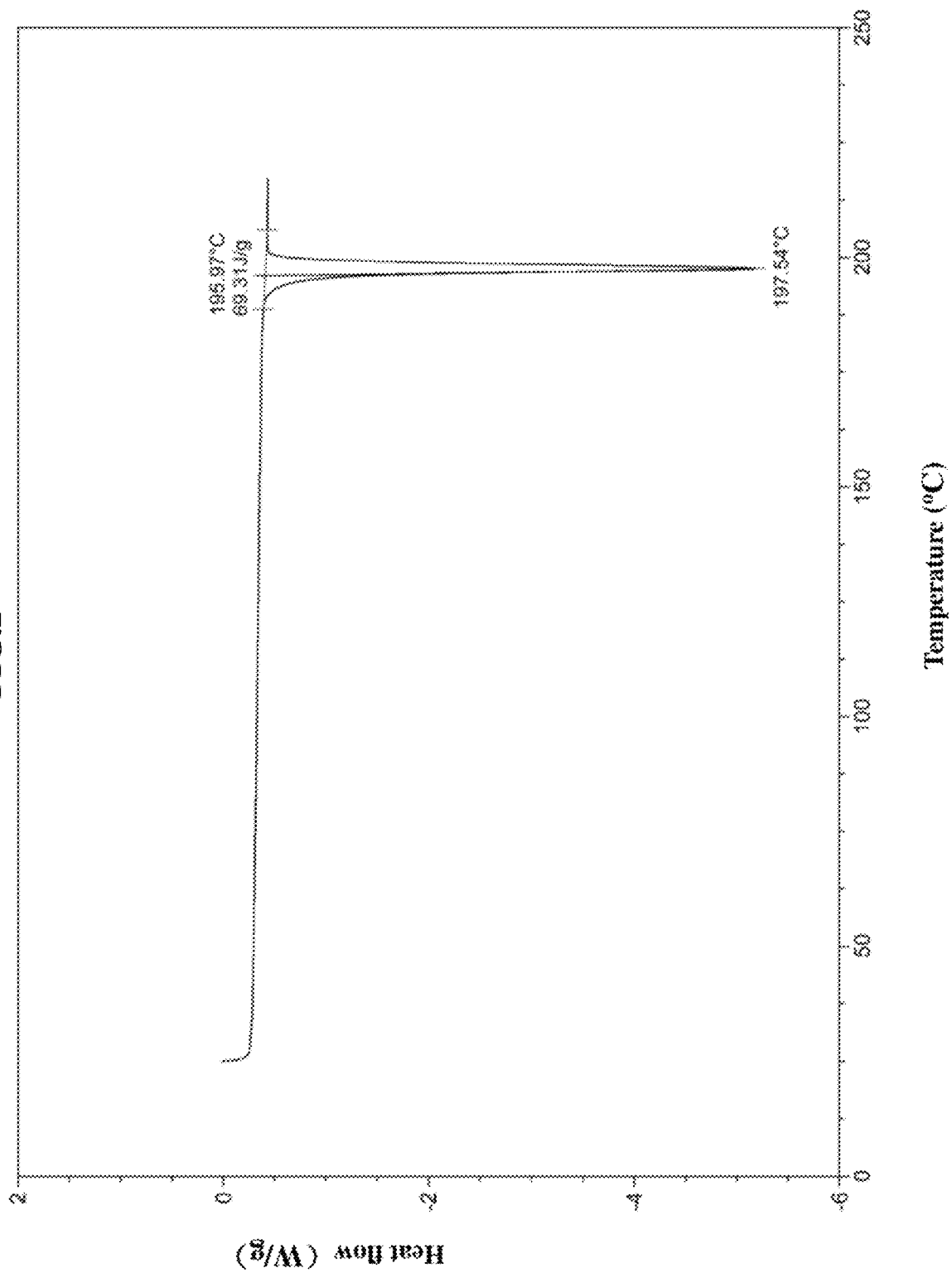
FIG. 2 is a differential scanning calorimetry (DSC) thermogram of crystal form B of the compound of formula (1), wherein the ordinate represents heat flow, with the unit being (W/g), and the abscissa represents temperature, with the unit being (° C.).

Crystal form B of the compound of formula (1) prepared in Example 1 showed an endothermic peak in the range of 197° C.±2° C., and the differential scanning calorimetry analysis diagram thereof was as shown in FIG. 2.

Figure 5:
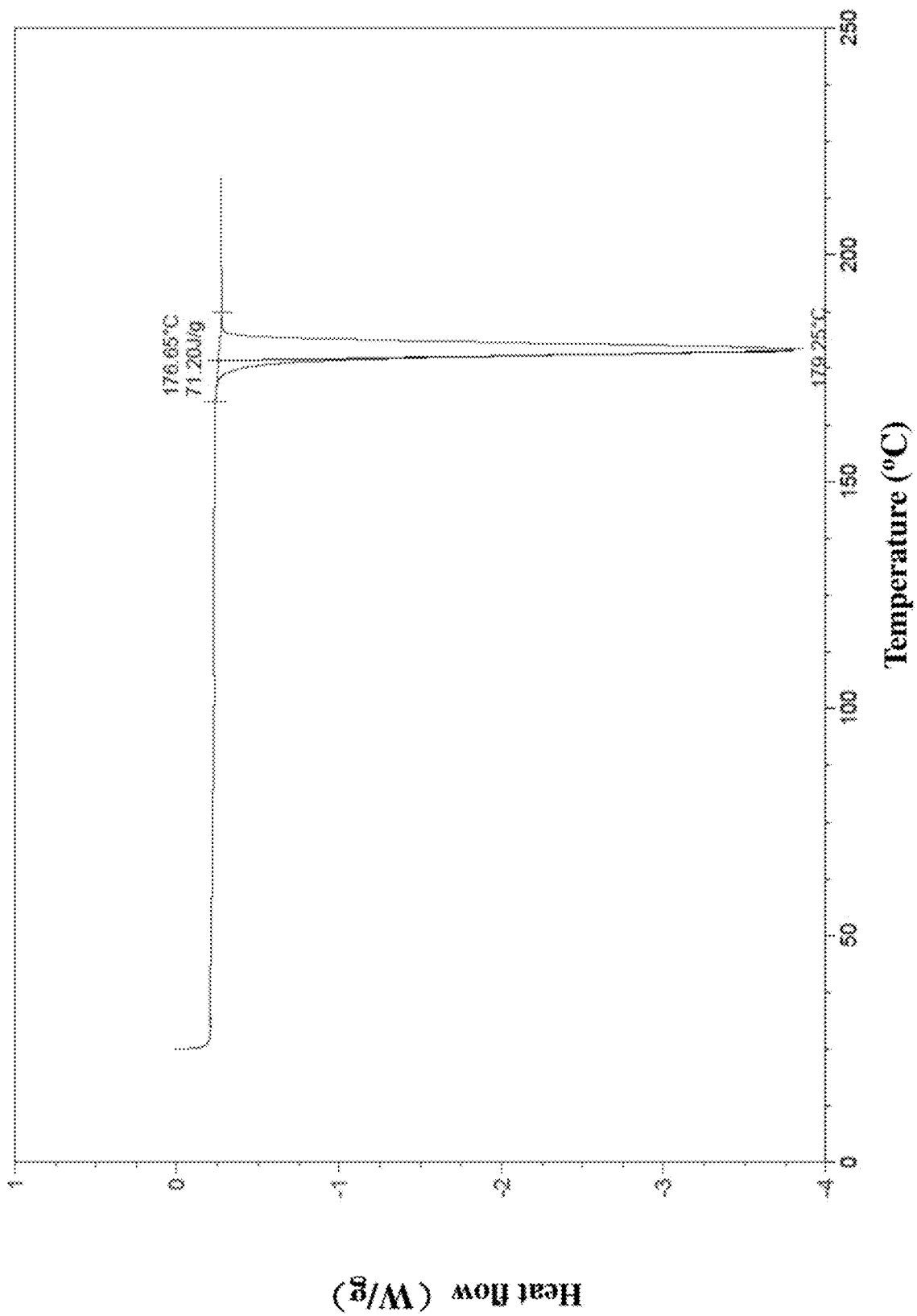
FIG. 5 is a differential scanning calorimetry (DSC) thermogram of crystal form A of the compound of formula (1), wherein the ordinate represents heat flow, with the unit being (W/g), and the abscissa represents temperature, with the unit being (° C.).

Crystal form A of the compound of formula (1) prepared in Example 2 showed an endothermic peak in the range of 179° C.±2° C., and the differential scanning calorimetry analysis diagram thereof was as shown in FIG. 5.

Figure 8:
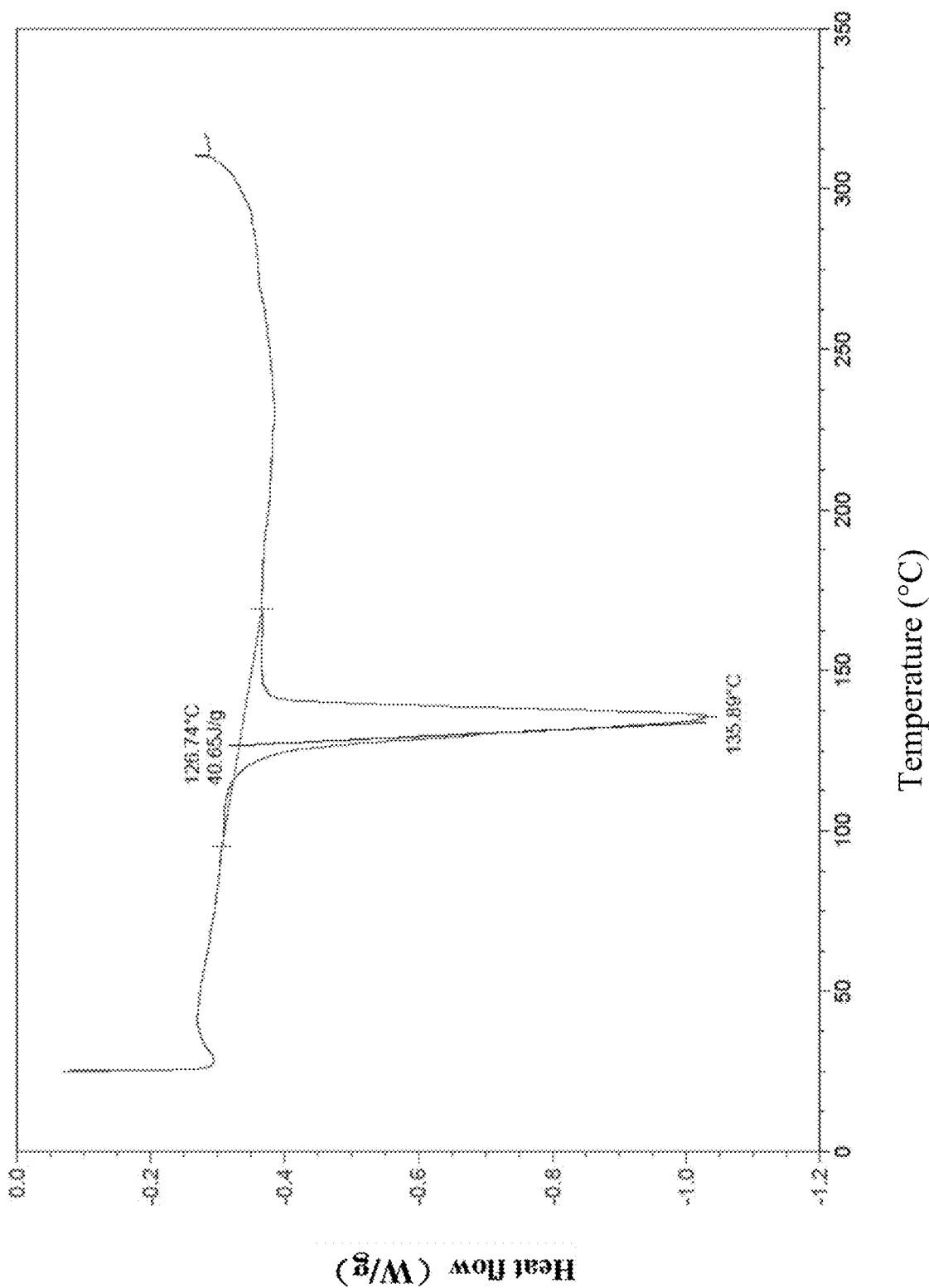
FIG. 8 is a differential scanning calorimetry (DSC) thermogram of crystal form X of the compound of formula (1), wherein the ordinate represents heat flow, with the unit being (W/g), and the abscissa represents temperature, with the unit being (° C.).

Crystal form X of the compound of formula (1) prepared in Example 3 showed an endothermic peak in the range of 136° C.±2° C., and the differential scanning calorimetry analysis diagram thereof was as shown in FIG. 8.

Figure 11:
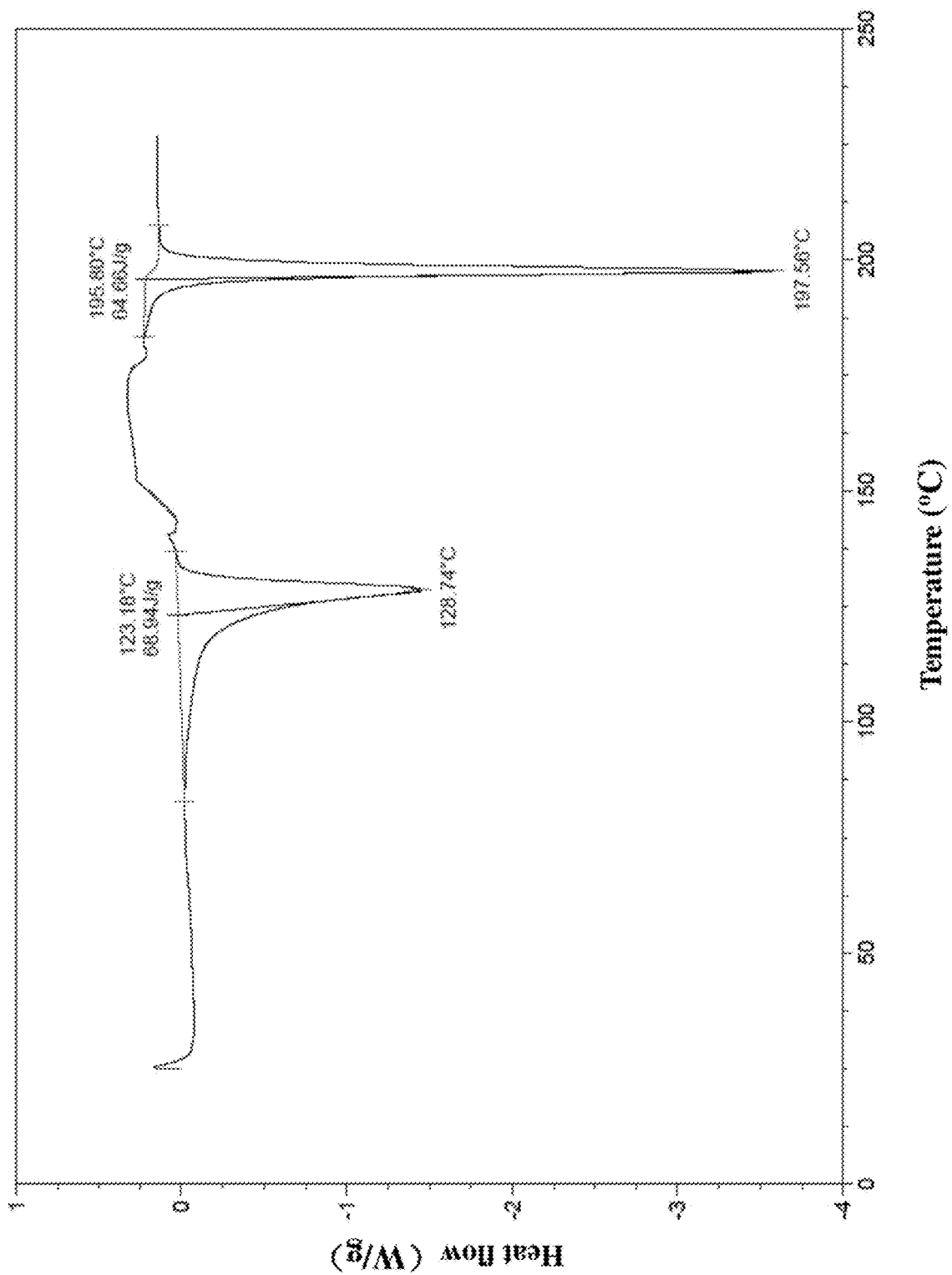
FIG. 11 is a differential scanning calorimetry (DSC) thermogram of crystal form 4 of the compound of formula (1), wherein the ordinate represents heat flow, with the unit being (W/g), and the abscissa represents temperature, with the unit being (° C.).

Crystal form 4 of the compound of formula (1) prepared in Example 4 showed an endothermic peak in the range of 125° C. to 135° C. and an endothermic peak in the range of about 195° C. to 200° C., and the differential scanning calorimetry analysis diagram thereof was as shown in FIG. 11.

The actually measured starting and maximum temperatures in DSC determination had a certain degree of variability depending on the measurement parameters and the heating rate.

Thermogravimetric Analysis

Test conditions: Purging with nitrogen at 60 ml/min, and data collection at a heating rate of 10° C./min between room temperature and 400° C.

Figure 3:
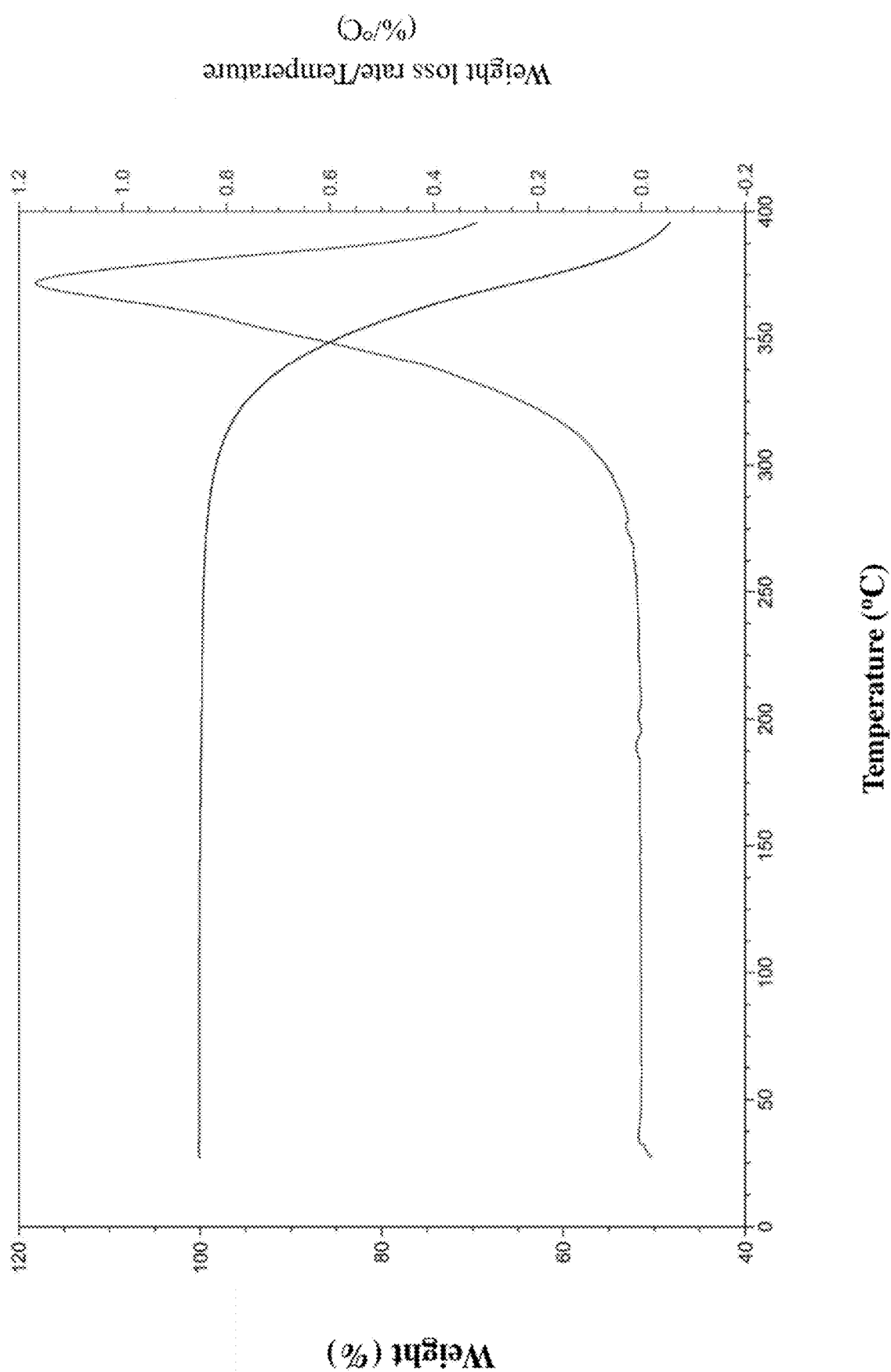
FIG. 3 is a thermogravimetric analysis (TG) curve and a derivative thermogravimetric analysis (DTG) curve of crystal form B of the compound of formula (1), wherein the abscissa is temperature (° C.), the left ordinate represents weight (%), and the right ordinate represents the relationship between weight loss rate (%) and temperature.

Crystal form B of the compound of formula (1) prepared in Example 1 had no weight loss in the range below 250° C., and the TG curve thereof was as shown in FIG. 3.

Figure 6:
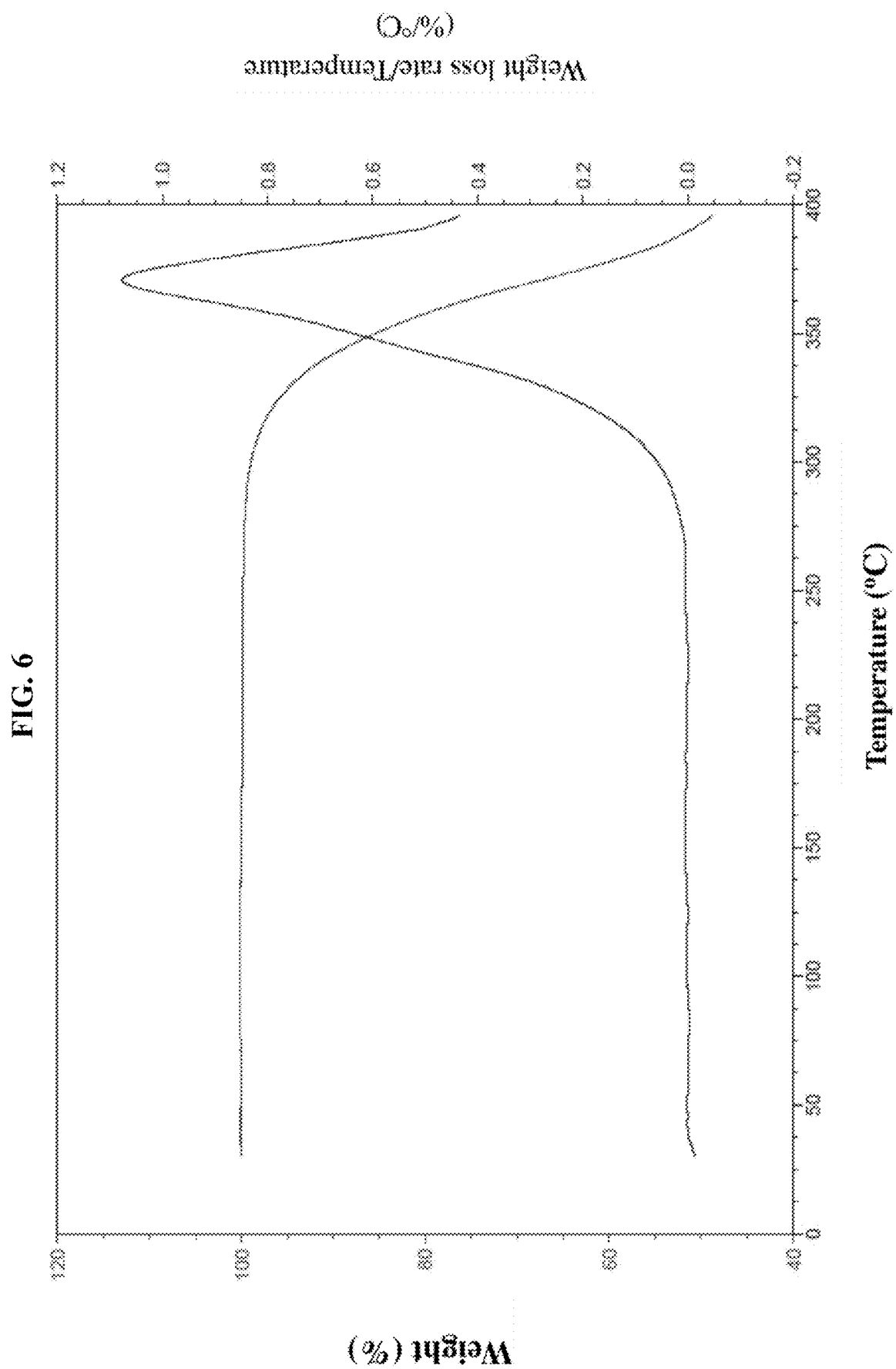
FIG. 6 is a thermogravimetric analysis (TG) curve and a derivative thermogravimetric analysis (DTG) curve of crystal form A of the compound of formula (1), wherein the abscissa is temperature (° C.), the left ordinate represents weight (%), and the right ordinate represents the relationship between weight loss rate (%) and temperature.

Crystal form A of the compound of formula (1) prepared in Example 2 had no weight loss in the range below 250° C., and the TG curve thereof was as shown in FIG. 6.

Figure 9:
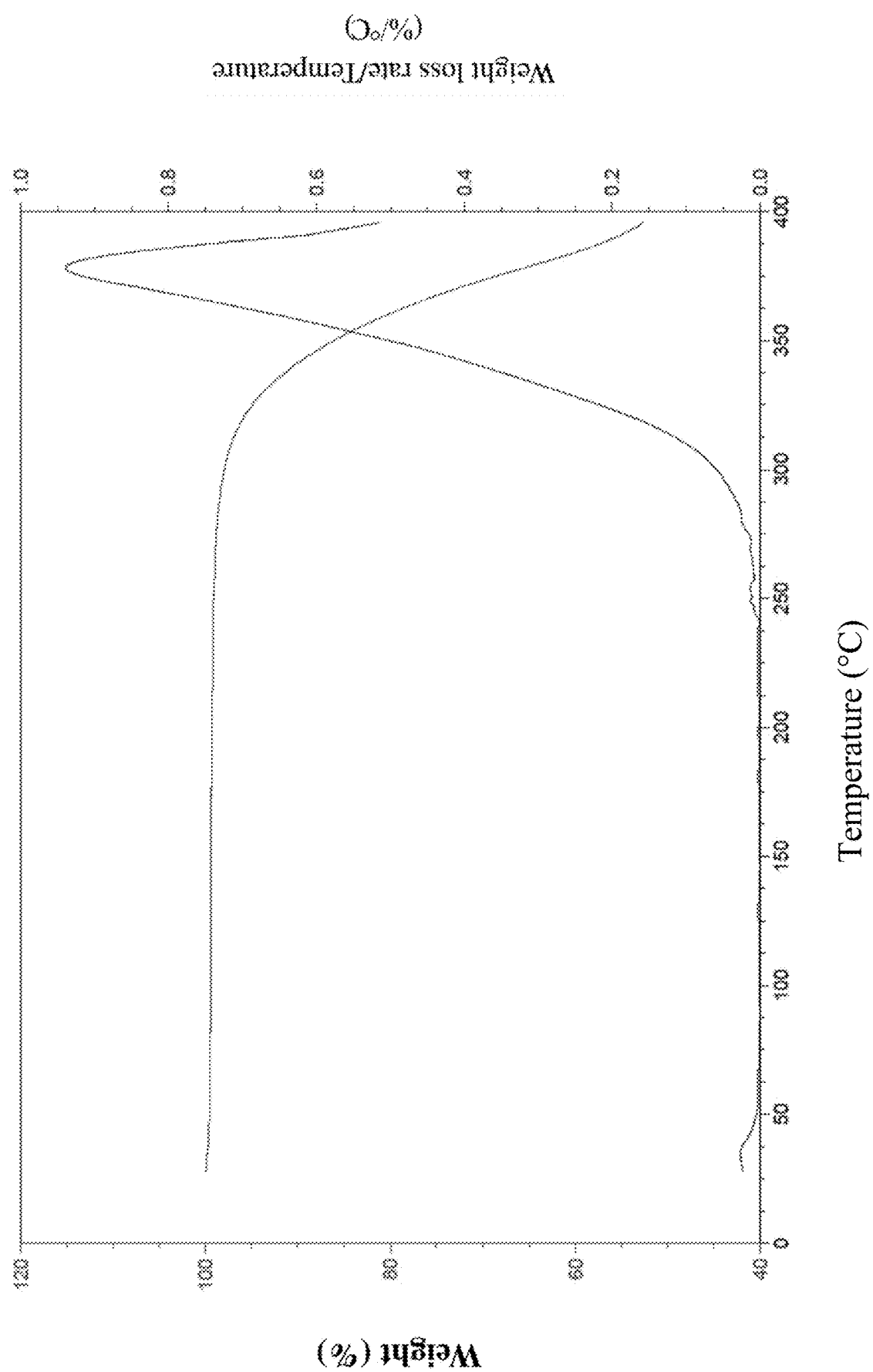
FIG. 9 is a thermogravimetric analysis (TG) curve and a derivative thermogravimetric analysis (DTG) curve of crystal form X of the compound of formula (1), wherein the abscissa is temperature (° C.), the left ordinate represents weight (%), and the right ordinate represents the relationship between weight loss rate (%) and temperature.

Crystal form X of the compound of formula (1) prepared in Example 3 had no weight loss in the range below 250° C., and the TG curve thereof was as shown in FIG. 9.

Figure 12:
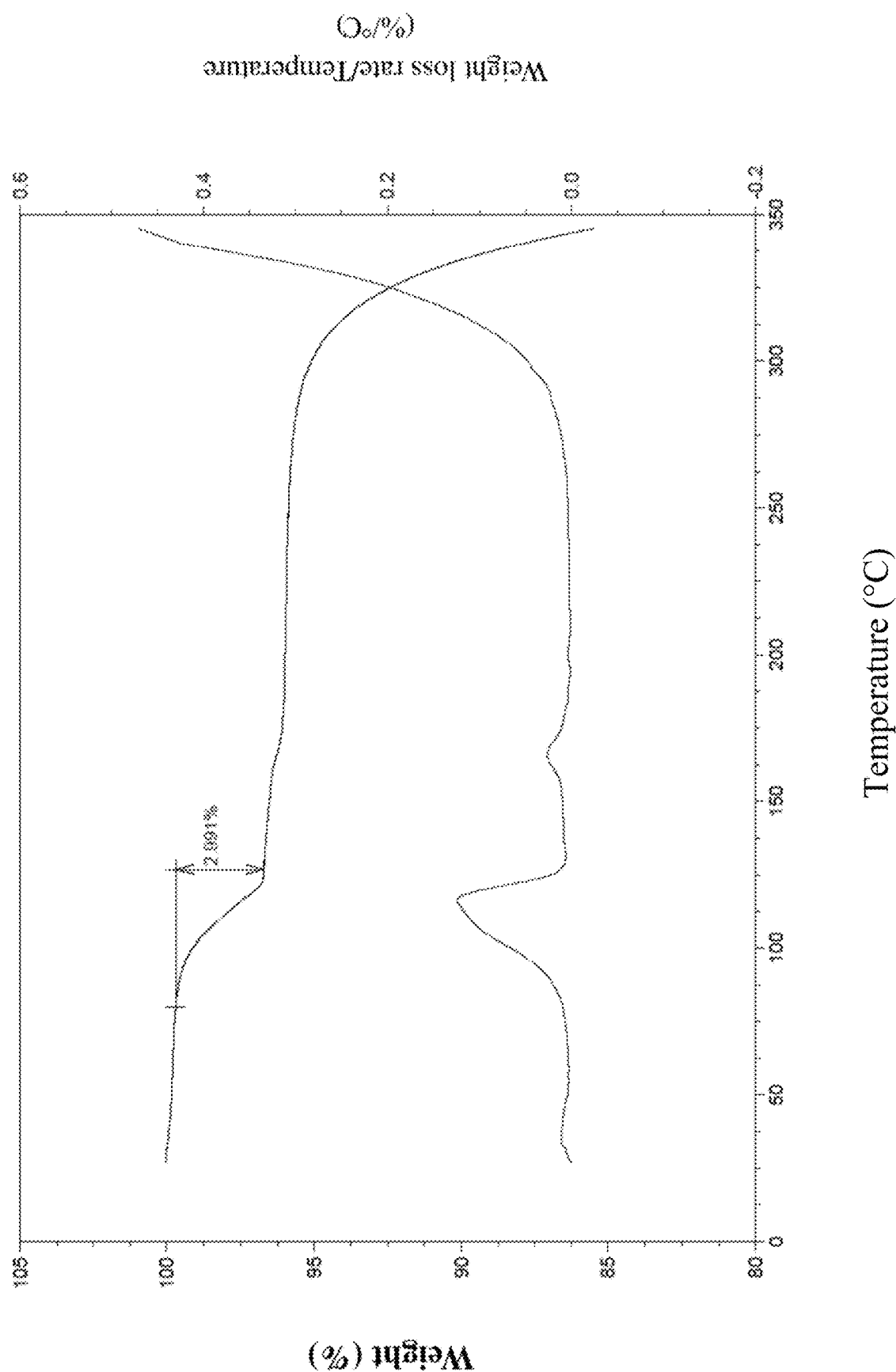
FIG. 12 is a thermogravimetric analysis (TG) curve and a derivative thermogravimetric analysis (DTG) curve of crystal form 4 of the compound of formula (1), wherein the abscissa is temperature (° C.), the left ordinate represents weight (%), and the right ordinate represents the relationship between weight loss rate (%) and temperature.

Crystal form 4 of the compound of formula (1) prepared in Example 4 had a weight loss of 2.991% in the range below 250° C., and the TG curve thereof was as shown in FIG. 12.

Example 5: Study of Solubility of Crystal Forms A and B of Compound of Formula (1) and Amorphous Form of Compound of Formula (1)

1. Test Sample

The amorphous form of the compound of formula (1) was prepared with reference to a method from CN 201580052631.0;
  crystal form B of the compound of formula (1) was prepared according to method 1 of Example 1; and
  crystal form A of the compound of formula (1) was prepared according to the method of Example 2.

2. Experimental Method

Appropriate amounts of crystal forms A and B of the compound of formula (1) and the amorphous form of the compound of formula (1) were respectively weighed, buffered salt solutions with pH 1.0, 4.5, 6.8 and 7.4 (see "European Pharmacopoeia" for the preparation of buffered salt solutions) were respectively added, the mixtures were shaken at 25° C. for 24 h, high performance liquid chromatography-external standard method was used for quantification, and the solubility was determined.

3. Experimental Results

The solubility (mg/mL) of crystal forms A and B and the amorphous form of the compound of formula (1) under different pH conditions were as shown in Table 1.

TABLE 1

| Solubility experimental results | | | | |
|---|---|---|---|---|
| Test sample | pH 1.0 | pH 4.5 | pH 6.8 | pH 7.4 |
| Crystal form A | 16.9 | 0.002 | Not detected | Not detected |
| Crystal form B | 19.8 | 0.022 | 0.013 | 0.010 |
| Amorphous form | 11.2 | 0.017 | 0.010 | 0.0087 |

3. Analysis of Results

In a low pH value environment, the solubility of crystal form B was greater than that of the amorphous form and crystal form A.

Example 6: Study of Stability of Crystal Forms A and B of Compound of Formula (1) and amorphous form of compound of formula (1)

1. Test Sample

The amorphous form of the compound of formula (1) was prepared with reference to a method from CN 201580052631.0;
  crystal form B of the compound of formula (1) was prepared according to method 1 of Example 1; and crystal form A of the compound of formula (1) was prepared according to the method of Example 2.

2. Study Conditions 2.1 Study Conditions for Crystal Form B of the Compound of Formula (1):
Placed at 105° C. for 5 days, left open, and sampled and tested on days 1 and 5;
placed at 60° C. for 10 days, left open, and sampled and tested on days 5 and 10;
placed under 25° C. RH 92.5% conditions for 10 days, left open, and sampled and tested on days 5 and 10;
under light conditions, using open and closed conditions (polyethylene bag+composite film bag), and sampling and testing when illumination requirements were met; and
placed under 40° C. RH 75% conditions for 1 month, left open, and sampled and tested on day 10 and after 1 month.

2.2 Study Conditions for Crystal Form a of the Compound of Formula (1):
Placed at 105° C. for 5 days, left open, and sampled and tested on days 1 and 5;
placed at 60° C. for 10 days, left open, and sampled and tested on days 5 and 10;
placed under 25° C. RH 92.5% conditions for 10 days, left open, and sampled and tested on days 5 and 10;
under light conditions, left open, and sampled and tested when illumination requirements were met; and
placed under 40° C. RH 75% conditions for 10 days, left open, and sampled and tested on days 5 and 10.

2.3 Study Conditions for the Amorphous Form of the Compound of Formula (1):
Placed at 60° C. for 10 days, left open, and sampled and tested on day 10; placed under 25° C. RH 92.5% conditions for 10 days, left open, and sampled and tested on day 10; and
under light conditions, using open and closed conditions (polyethylene bag+composite film bag), and sampling and testing when illumination requirements were met.
Illumination requirements: ICH Q1B Stability Test: Photostability Testing of New Drug Substances and formulation.

3. Determination Method

Determination of related substances: Determination by high performance liquid chromatography in accordance with "Chinese Pharmacopoeia", 2015 edition, Vol. four, General Principle 0512.

Moisture determination: Determination according to "Chinese Pharmacopoeia", 2015 edition, vol. four, General Principle 0832, Moisture Determination Method, First Method (Fischer's method), 2 Coulometric Titration Method.

XRD determination: Determination according to "Chinese Pharmacopoeia", 2015 edition, vol. four, General Principle 0451 X-ray Diffraction Method—Second Method, Powder X-ray Diffraction Method.

4. Test Results

The stability data of crystal forms A and B and the amorphous form of the compound of formula (1) were as shown in Tables 2-5.

TABLE 2

Stability results

| Test sample | Placement conditions | Properties | Overall related % | Moisture % | XRD |
|---|---|---|---|---|---|
| Crystal form A of the compound of formula (1) | Day 0 | Off-white powder | 0.64 | 0.25 | — |
| | Day 1, at 105° C., open | Off-white powder | 0.78 | 0.18 | — |
| | Day 5, at 105° C., open | Off-white powder | 1.6 | 0.17 | same as day 0 |
| | Day 5, at 60° C., open | Off-white powder | 0.81 | 0.17 | — |
| | Day 10, at 60° C., open | Off-white powder | 1.0 | 0.11 | same as day 0 |
| | Day 5, at 40° C. RH 75%, open | Off-white powder | 0.79 | 0.23 | — |
| | Day 10, at 40° C. RH 75%, open | Off-white powder | 0.89 | 0.15 | Same as day 0 |
| | Day 5, at 25° C. RH 92.5%, open | Off-white powder | 0.69 | 0.23 | — |
| | Day 10, at 25° C. RH 92.5%, open | Off-white powder | 0.78 | 0.17 | Same as day 0 |

TABLE 3

Stability results

| Test sample | Placement conditions | Properties | Overall related % | Moisture % | XRD |
|---|---|---|---|---|---|
| Crystal form B of the compound of formula (1) | Day 0 | Off-white crystalline powder | 0.09 | 0.38 | — |
| | Day 1, at 105° C., open | Off-white crystalline powder | 0.10 | 0.34 | — |
| | Day 5, at 105° C., open | Off-white crystalline powder | 0.08 | 0.37 | Same as day 0 |
| | Day 5, at 60° C., open | Off-white crystalline powder | 0.08 | 0.26 | — |
| | Day 10, at 60° C., open | Off-white crystalline powder | 0.10 | 0.45 | Same as day 0 |

TABLE 3-continued

Stability results

| Test sample | Placement conditions | Properties | Overall related % | Moisture % | XRD |
|---|---|---|---|---|---|
| | Day 10, at 40° C. RH 75%, open | Off-white crystalline powder | 0.09 | 0.42 | Same as day 0 |
| | 1 M, at 40° C. RH 75%, open | Off-white crystalline powder | 0.11 | 0.39 | Same as day 0 |
| | Day 5, at 25° C. RH 92.5%, open | Off-white crystalline powder | 0.07 | 0.37 | — |
| | Day 10, at 25° C. RH 92.5%, open | Off-white crystalline powder | 0.10 | 0.43 | Same as day 0 |
| | Light - closed | Off-white crystalline powder | 0.10 | 0.41 | Same as day 0 |

TABLE 4

Stability results

| Test sample | Placement conditions | Properties | Overall related % | Moisture % | XRD |
|---|---|---|---|---|---|
| Amorphous form of the compound of formula (1) | Day 0 | Off-white powder | 0.84 | 0.92 | — |
| | Day 10, at 60° C., open | Light yellow powder | 1.78 | 0.69 | Same as day 0 |
| | Day 10, at 25° C. RH 92.5%, open | Off-white powder | 0.90 | 6.9 | Same as day 0 |
| | Light - closed | Off-white powder | 0.88 | 0.62 | Same as day 0 |

TABLE 5

Stability results

| Test sample | Placement conditions | Properties | Overall related % | Moisture % | XRD |
|---|---|---|---|---|---|
| Amorphous form of the compound of formula (1) | Day 0 | Off-white powder | 0.84 | 0.92 | — |
| | Light - open | Light yellow powder | 10.19 | 2.3 | Same as day 0 |
| Crystal form A of the compound of formula (1) | Day 0 | Off-white powder | 0.64 | 0.25 | — |
| | Light - open | Light yellow powder | 1.9 | 0.23 | Same as day 0 |
| Crystal form B of the compound of formula (1) | Day 0 | Light yellow powder | 0.10 | 0.27 | — |
| | Light - open | Yellow powder | 0.54 | 0.21 | Same as day 0 |

5. Test Conclusions

Crystal forms A and B of the compound of formula (1) were placed at 105° C. for 5 days, placed under the conditions of 60° C., 25° C. RH 92.5% for 10 days, placed under light closed conditions to meet illumination requirements and placed under 40° C. RH 75% conditions for 1 month, none of the properties, moisture, related substances, and XRD of the sample showed significant change; whereas, as for the amorphous compound of formula (1), the related substances were increased to 1.78% when placed at 60° C. for 10 days, the moisture increased to 6.9% under high humidity conditions, and the related substances increased to 10.19% after placement under light open conditions to meet illumination requirements. It was indicated that the amorphous form of the compound of formula (1) was unstable under high temperature, high humidity and light conditions, whereas crystal forms A and B of the compound of formula (1) were relatively stable under the above conditions, causing convenience for the preparation, transportation and storage of the drug and more facilitating ensuring the effectiveness and safety of the drug use.

Example 7: Study of Moisture Absorbability of Crystal Forms A and B of Compound of Formula (1) and Amorphous Form of Compound of Formula (1)

1. Test Sample

The amorphous form of the compound of formula (1) was prepared with reference to a method from CN 201580052631.0;

crystal form B of the compound of formula (1) was prepared according to method 1 of Example 1; and crystal form A of the compound of formula (1) was prepared according to the method of Example 2.

2. Determination Method

A Test sample was taken and determined according to Chinese Pharmacopoeia, 2015 edition, vol. four, General Principle 9103, Guiding Principles for Drug Moisture Absorbability Test.

3. Test Results

TABLE 6
Moisture absorbability results

| Test sample | Hygroscopic weight gain (%) | Moisture absorbability results |
| --- | --- | --- |
| Amorphous form of the compound of formula (1) | 2.8 | Having moisture absorbability |
| Crystal form A of the compound of formula (1) | 0.08 | No or almost no moisture absorbability |
| Crystal form B of the compound of formula (1) | 0.11 | No or almost no moisture absorbability |

It could be seen from the above experimental results that compared with the amorphous form of the compound of formula (1), crystal forms A and B of the compound of formula (1) had no or almost no moisture absorbability and showed obvious advantages.

Example 8: Examination on the Fluidity of Crystal Form B of the Compound of Formula (1)

1. Test Sample

The amorphous form of the compound of formula (1) was prepared with reference to a method from CN 201580052631.0;
Crystal forms A and B of the compound of formula (1) were respectively prepared according to Examples 2 and Method 1 in Example 1.

2. Raw Material Treatment

The amorphous form and crystal forms A and B of the compound of formula (1) were treated by universal pulverization.

3. Experimental Results and Conclusions

TABLE 7
Fluidity experimental results

| Test sample | Crystal form A | Crystal form B | Amorphous form |
| --- | --- | --- | --- |
| Angle of repose/° | 53 | 45.8 | 50.6 |

TABLE 8
Fluidity experimental results

| Test sample | $\rho_{bulk}$g/ml | $\rho_{tapped}$g/ml | Carr's index % |
| --- | --- | --- | --- |
| Crystal form A | 0.35 | 0.63 | 0.45 |
| Crystal form B | 0.477 | 0.683 | 0.30 |

The fluidity of the crystal form could be characterized by the angle of repose and the Carr's index. It was generally believed that the smaller the angle of repose and the Carr's index, the better the fluidity. From the experimental results in Tables 7 and 8, crystal form B had better fluidity and no electrostatic phenomenon after pulverization, and crystal form A also had no obvious electrostatic phenomenon after pulverization, whereas the amorphous form of the compound of formula (1) showed serious electrostatic phenomenon after pulverization and was not easy to weigh, indicating that crystal form B of the compound of formula (1) was easier to be formulated.

The above descriptions are only exemplary embodiments of the present invention and are not intended to limit the scope of protection of the present invention, which is determined by the appended claims.

What is claimed is:

1. Crystal form B of a compound of formula (1), characterized by an X-ray powder diffraction pattern comprising characteristic peaks at 11.9±0.2°, 14.0±0.2°, 15.2±0.2°, 17.2±0.2°, 17.5±0.2°, and 21.5±0.2° expressed as 2θ angles using Cu-Kα radiation;

Formula (1)

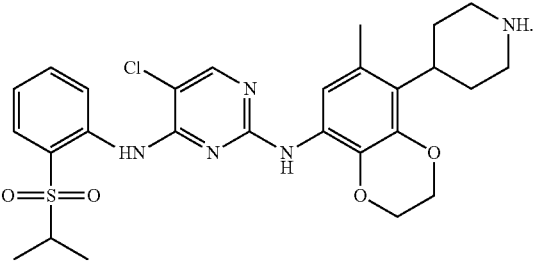

2. The crystal form B according to claim 1, characterized by a differential scanning calorimetry analysis diagram comprising an endothermic peak in the range of 190° C. to 205° C.

3. The crystal form B according to claim 1, characterized by a thermogravimetric analysis wherein the crystal form B has no weight loss at 250° C. or less.

4. A method for preparing the crystal form B according to claim 1, comprising:
mixing a compound of formula (1) with an organic solvent;
stirring the mixture;
heating the mixture to a first temperature;
adding water;
continuing to stir and heat the mixture to a second temperature;
performing a gradient cooling to 10-30° C.; and
performing filtration and drying to obtain the crystal form B.

5. The method according to claim 4, wherein
the first temperature is between 40° C. and 80° C.; and
the second temperature is between 40° C. and 80° C.

6. The method according to claim 4, wherein the gradient is between 1° C./h and 15° C./h.

7. The method according to claim 4, wherein the organic solvent is
selected from the group consisting of methanol, ethanol, propanol, isopropanol, n-butanol, isobutanol, tert-butanol, sec-butanol, n-pentanol, n-hexanol, ethylene glycol, propylene glycol, and glycerol.

8. The method according to claim 4, wherein the volume ratio of the organic solvent to water is between 1:6 and 6:1.

9. A crystal form of a compound of formula (1), which is crystal form A or crystal form 4,
wherein crystal form A characterized by an X-ray powder diffraction pattern comprising characteristic peaks at 4.8±0.2°, 9.6±0.2°, 12.1±0.2°, 12.9±0.2°, 14.0±0.2°, and 15.0±0.2° expressed at 2θ angles using Cu-Kα radiation; or wherein crystal form 4 characterized by an X-ray powder diffraction pattern comprising characteristic peaks at 5.4±0.2°, 7.4±0.2, 8.4±0 2°, 9.8±0 2°, 10.8±0.2°, and 16.7±0.2° expressed at 2θ angles using Cu-Kα radiation,

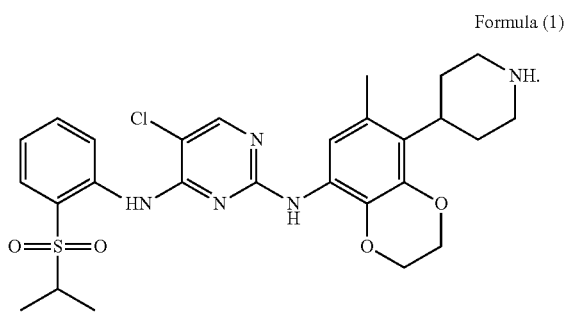 [SMILES: Cc1cc(Nc2ncc(Cl)c(Nc3ccccc3S(=O)(=O)C(C)C)n2)c2c(c1C1CCNCC1)OCCO2]

Formula (1)

10. The crystal form according to claim 9, characterized by
 a differential scanning calorimetry analysis diagram of crystal form A comprising an endothermic peak in the range of 172° C. to 182° C.; or
 a differential scanning calorimetry analysis diagram of crystal form 4 comprising an endothermic peak in the range of 125° C. to 135° C.

11. The crystal form according to claim 9, characterized by a thermogravimetric analysis wherein the crystal form A has no weight loss at 250° C. or less.

12. A pharmaceutical composition comprising the crystal form B according to claim 1, wherein the pharmaceutical composition further comprises one or more pharmaceutically acceptable carriers and/or diluents.

13. A method for the treatment of an ALK-mediated disease, comprising administering the crystal form B according to claim 1 in a patient in need thereof, wherein, the ALK-mediated disease is cancer.

14. The crystal form B according to claim 1, wherein the crystal form B is characterized by the X-ray powder diffraction pattern comprising further characteristic peaks at 12.3±0.2°, 15.8±0.2°, 18.5±0.2°, 19.0±0.2°, 19.3±0.2°, and 20.4±0.2°.

15. The crystal form B according to claim 14, wherein the crystal form B is characterized by the X-ray powder diffraction pattern comprising further characteristic peaks at 8.6±0.2°, 10.2±0.2°, 20.7±0.2°, 21.9±0.2°, 24.0±0.2°, and 24.3±0.2°.

16. The crystal form B according to claim 1, wherein the crystal form B is characterized by the X-ray powder diffraction pattern substantially as shown in FIG. 1.

17. The crystal form according to claim 9, wherein the crystal form A is characterized by the X-ray powder diffraction pattern comprising further characteristic peaks at 7.3±0.2°, 15.6±0.2°, 15.9±0.2°, 16.7±0.2°, 18.0±0.2°, 19.0±0.2°, and 19.5±0.2°.

18. The crystal form according to claim 17, wherein the crystal form A is characterized by the X-ray powder diffraction pattern comprising further characteristic peaks at 9.9±0.2°, 13.5±0.2°, 18.3±0.2°, 19.9±0.2°, 20.6±0.2°, and 21.2±0.2°.

19. The crystal form according to claim 9, wherein the crystal form A is characterized by the X-ray powder diffraction pattern substantially as shown in FIG. 4.

20. The crystal form according to claim 9, wherein the crystal form 4 is characterized by the X-ray powder diffraction pattern comprising further characteristic peaks at 6.4±0.2°, 12.0±0.2°, 12.8±0.2°, 13.9±0.2°, 17.7±0.2°, 19.7±0.2°, and 23.1±0.2°.

* * * * *